(12) United States Patent
Asami

(10) Patent No.: US 8,301,708 B2
(45) Date of Patent: Oct. 30, 2012

(54) COMMUNICATION SYSTEM, COMMUNICATION APPARATUS, COMMUNICATION SERVER, COMMUNICATION METHOD, INFORMATION STORAGE MEDIUM, AND PROGRAM

(75) Inventor: Yuichi Asami, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 258 days.

(21) Appl. No.: 12/675,552

(22) PCT Filed: Jul. 9, 2008

(86) PCT No.: PCT/JP2008/062406
§ 371 (c)(1),
(2), (4) Date: Feb. 26, 2010

(87) PCT Pub. No.: WO2009/028267
PCT Pub. Date: Mar. 5, 2009

(65) Prior Publication Data
US 2010/0217798 A1    Aug. 26, 2010

(30) Foreign Application Priority Data
Aug. 30, 2007 (JP) .................. 2007-223938

(51) Int. Cl.
*G06G 15/16* (2006.01)
(52) U.S. Cl. .................. 709/206; 709/207; 709/203
(58) Field of Classification Search .................. 709/203, 709/207, 206; 463/42, 29
See application file for complete search history.

(56) References Cited

U.S. PATENT DOCUMENTS

| 6,848,997 | B1* | 2/2005 | Hashimoto et al. ............. 463/42 |
| 7,056,217 | B1* | 6/2006 | Pelkey et al. .................. 463/43 |
| 2002/0035594 | A1* | 3/2002 | Dreke et al. .................. 709/203 |
| 2004/0249899 | A1* | 12/2004 | Shiigi ............................ 709/206 |
| 2005/0026696 | A1* | 2/2005 | Hashimoto et al. ............. 463/42 |
| 2006/0015560 | A1* | 1/2006 | MacAuley et al. ........... 709/206 |

FOREIGN PATENT DOCUMENTS

| JP | 2002-346232 | 12/2002 |
| JP | 2002-360936 | 12/2002 |
| JP | 2003-038858 | 2/2003 |
| JP | 2004-097622 | 4/2004 |
| JP | 2004-336740 | 11/2004 |
| TW | 200614040 A | 5/2006 |
| TW | 200701104 A | 1/2007 |

OTHER PUBLICATIONS

Taiwanese Office Action with English Translation issued on Feb. 22, 2012.

* cited by examiner

*Primary Examiner* — Asghar Bilgrami
(74) *Attorney, Agent, or Firm* — Howard & Howard Attorneys PLLC

(57) ABSTRACT

In a communication system (1), a communication server (20) determines whether to allow or disallow each of communication apparatuses (10) to send message data and send the communication apparatuses (10) a notice indicating the determination result. A communication apparatus (10) that is allowed to send accepts an input of message data from a user and sends the message data to the communication server (20), and the other communication apparatuses (10) that are disallowed do not accept the message data. When all the communication apparatuses (10) are allowed to send message data, the communication server (20) receives message data from all of them and sends the message data thereto. When some of the communication apparatuses (10) are allowed to send message data, the communication apparatus (20) receives message data only from the allowed communication apparatuses (10) and send the message data to all the communication apparatuses (10).

20 Claims, 15 Drawing Sheets

| CONDITION | DISALLOWED TIME PERIOD DURATION |
|---|---|
| 30 POINTS OR BELOW | T1 |
| 40 POINTS | T2 |
| 50 POINTS | T3 |
| 60 POINTS OR MORE | T4 |
| ... | ... |
| MULTIPLIER VALUE 2 | MULTIPLIED BY C1 |
| MULTIPLIER VALUE 3 | MULTIPLIED BY C2 |
| MULTIPLIER VALUE 4 | MULTIPLIED BY C3 |
| ... | ... |
| DEALER | ADD T5 |
| NON-DEALER | MULTIPLIED BY 1 |
| YAKUMAN | T6 |
| WINNING HAND OF ○○ COMPLETED | MULTIPLIED BY C4 |
| ... | ... |

COMMUNICATION SYSTEM, COMMUNICATION APPARATUS, COMMUNICATION SERVER, COMMUNICATION METHOD, INFORMATION STORAGE MEDIUM, AND PROGRAM

TECHNICAL FIELD

The present invention relates to a communication system, a communication apparatus, a communication server, a communication method, an information storage medium, and a program that are suitable for readily conveying game information to players during the progress of the game.

BACKGROUND ART

Recent years have seen dissemination of network games, which allow a plurality of players to participate via the Internet, etc. For example, Patent Literature 1 discloses a network gaming system in which information on a playroom, participating players, and the like can be efficiently provided. The gaming system according to Patent Literature 1 searches a database based on search conditions input by a player and provides information on a playroom or participating players that matches the search conditions. The player can search for his/her desired playroom and choose the playroom in which to participate.

Patent Literature 1: Unexamined Japanese Patent Application KOKAI Publication No. 2004-097622

DISCLOSURE OF INVENTION

Problem to be Solved by the Invention

However, in a virtual-space game, each player had to constantly monitor the screen by frequently bringing up the game outcome screen, etc. Otherwise, it was difficult to know specific information, such as an update of the game and the results, e.g., which player brought about an event that occurred during the game, when that event took place, etc. When many players play a network game, how an attempt made by one of the players has ended up in a success or failure could not be easily found out without communication with that particular player by phone, email, chatting, or the like. An example is a network game where many players each manipulate a character to play rope jumping in a virtual space. In this kind of game, a success or failure of an attempt by one of the players affects all the other players. A player who has made a failed attempt is not given an opportunity to explain his/her failure, and the other players are not given an opportunity to listen to (see) such an explanation. Also, for example, in a win-or-lose game, the winning player only has a limited opportunity to boast his/her performance or to make explanatory comments in front of the losing players. The losing player also had a limited opportunity to make an excuse. In a conventional network game, only little information was supplied from the participants, including the winning player, the losing player, and a key player of the game. The problem was lack of tension during the game.

The present invention is made to solve this problem. The present invention is directed to providing a communication system, a communication apparatus, a communication server, a communication method, an information storage medium, and a program that are suitable for readily conveying game information to players during the progress of the game.

Means for Solving the Problem

To achieve the above object, embodiments of the present invention are disclosed below.

A communication system according to a first aspect of the present invention is a communication system comprising a server and a plurality of communication apparatuses connected with each other via a network, wherein the server comprises a determining unit, a notice sending unit, a message receiving unit, and a distributing unit; and the communication apparatuses each comprise a notice receiving unit, a message accepting unit, a message sending unit, and an output unit.

In the server, the determining unit determines whether to allow or disallow each of the plurality of communication apparatuses to send message data.

The notice sending unit sends a disallowance notice, the notice indicating that transmission of the message data is disallowed, to communication apparatuses that have been determined to be disallowed by the determining unit, of all the plurality of communication apparatuses.

In each of the communication apparatuses, the notice receiving unit receives the disallowance notice from the server.

The message accepting unit accepts an input of the message data from a user when the notice receiving unit is not in receipt of the disallowance notice.

The message sending unit sends the server the message data accepted by the message accepting unit.

Further in the server, the message receiving unit receives the message data from the communication apparatuses.

The distributing unit distributes the message data received by the message receiving unit to each of the communication apparatuses.

Further in each of the communication apparatuses, the output unit outputs message data distributed by the server.

According to the present invention, the communication system receives messages from users of the communication apparatuses and distributes the messages. Meanwhile, the communication system may allow only a specified communication apparatus to send a message and disallow the other communication apparatuses to do the same. As a specified player is given priority over the other players in message transmission, messages from the specified player and other game information can be conveyed to the other participating players.

For example, while a network game, chatting, or the like is in progress, all the participating users can be allowed to see or listen to comments, messages, or the like by a specified user. It can be done by notifying the communication apparatuses other than the one used by the specified user that input of a message is disallowed and allowing only the specified user to make comments and write messages. For example, in a network game, when one player wins, the outcome of the game and messages from the players involved in the game can be readily conveyed to all the players by allowing only the winning or losing player to make comments or write messages. The players involved in the game may include not only the wining and losing players, but also key players of the game, players observing the game, and the like.

The message accepting unit may also accept an input of the message data from the user upon lapse of a predetermined time period since last receipt of the disallowance notice.

Specifically, even if a communication apparatus is once notified that message input is disallowed, it can receive an input of a message again upon lapse of a predetermined time period. The communication system can control one communication apparatus so that it is alternately allowed and disallowed to send a message.

Each of the communication apparatuses may further comprise an identification (ID) information storage unit that stores in advance ID information for identifying the communication apparatuses.

Also, the notice sending unit may send the disallowance notice, which contains the ID information corresponding to the communication apparatuses that have been determined to be disallowed by the determining unit, to all the communication apparatuses comprised in the communication system, including the communication apparatuses that have been determined to be disallowed by the determining unit.

The message accepting unit may accept an input of the message data from a user when the ID information indicated in the disallowance notice received by the notice receiving unit does not agree with the ID information stored in the ID information storage unit.

According to the present invention, the server of the communication system is exempt from having to select a destination of a notice indicating from which communication apparatus message transmission is allowed or disallowed, each time a notice is given. The processing burden on the server is thereby reduced.

Each of the communication apparatuses may further comprise:

an operation input accepting unit that accepts an operation input by the user; and an operation input sending unit that sends the server information indicating the operation input accepted by the operation input accepting unit.

The server may further comprise:

an operation input receiving unit that receives, from the communication apparatuses, the information indicating the operation input.

The determining unit may determine, based on the information indicating the operation input received by the operation input receiving unit as well as on a predetermined condition set in advance for the communication apparatuses, whether each of the plurality of communication apparatuses satisfies the predetermined condition and disallow communication apparatuses that satisfy the predetermined condition to send message data.

According to the present invention, the server of the communication system can determine which communication apparatus is allowed or disallowed to send messages based on whether a predetermined condition is satisfied.

For example, in a network game, when passing a certain round of the game is a predetermined condition, the server can allow only the communication apparatuses of the players that did or did not pass that round to send a message. As a result, the participating players can acquire game information, such as who did and did not pass that round, without having to perform any special operation. Also, they can listen to (see) comments and the like of players who passed (did not pass) that round.

The message accepting unit may accept from the user an input of the message data by sound.

The output unit may replay and output sound of message data distributed from the server.

According to the present invention, the communication system can allow or disallow message transmission by sound. For example, in voice chatting, distribution of a sound message from a specified user may take precedence.

ID information for identifying a communication apparatus that is allowed to send the message data may be contained in the disallowance notice.

Each of the communication apparatuses may further comprise:

an image storage unit that stores ID information of the communication apparatuses and image data of a predetermined character object in association with each other.

The output unit may display each of the image data of the predetermined character object stored in the image storage unit in a predetermined display format when the notice receiving unit is not in receipt of the disallowance notice and highlights and displays image data corresponding to the ID information not contained in the disallowance notice when the notice receiving unit is in receipt thereof.

According to the present invention, each communication apparatus of the communication system clearly differentiates and displays communication apparatuses that are allowed and disallowed to send a message. The users can readily recognize which communication apparatus or player is currently allowed to write messages or make comments.

For example, to inform the users which communication apparatus is allowed or disallowed to send a message, the image corresponding to an allowed communication apparatus can be displayed relatively large. Also, the users can be informed of allowance and disallowance by differentiating a motion image indicating the allowed condition from motion images indicating the disallowed condition and displaying these images.

Each of the communication apparatuses may execute a network game via the network, and the server may manage progress of the network game.

The server may further comprise:

a parameter storage unit that in advance stores at least one of a predetermined timing, a predetermined situation, a predetermined scene, and a predetermined event of the network game as well as a numerical parameter for calculating the predetermined time period in association with each other; and a game determining unit that determines, in the network game, whether any one of the predetermined timing, the predetermined situation, and the predetermined scene has occurred or whether the predetermined event has occurred.

The notice sending unit may acquire from the parameter storage unit, upon determination by the game determining unit that one of the predetermined timing, the predetermined situation, and the predetermined scene has occurred or that the predetermined event has occurred, the numerical parameter associated with at least one of the predetermined timing, the predetermined situation, the predetermined scene, and the predetermined event; calculate the predetermined time period based on the acquired numerical parameter; and send the disallowance notice containing the calculated predetermined time period to the communication apparatuses that have been determined to be disallowed by the determining unit.

The message accepting unit may accept an input of the message data from a user upon lapse of the predetermined time period indicated in the disallowance notice received by the notice receiving unit since last receipt of the disallowance notice.

According to the present invention, the communication system can determine which communication apparatus is allowed or disallowed to send a message during the progress of a network game. The allowed (disallowed) time period can be changed based on the complexion of the game, the game results, etc. For example, a specified communication apparatus can be controlled so that it is given a long time to send a message at an important timing, in an important situation, upon appearance of an important scene, and upon occurrence of an important event of the game. Also, the specified communication apparatus can be controlled so that it is given a short time to send a message at an unimportant timing, in an unimportant situation, upon appearance of an unimportant scene, and upon occurrence of an unimportant event. For example, in a game for score competition, it can be controlled so that a longer time for message transmission is given for a higher score. For example, it may be controlled so that a player is given a longer time for message transmission for a greater impact that the player has made on the game.

The notice sending unit may calculate the predetermined time period so that the predetermined time period monotonously increases along with a time elapsed from the start of the network game to occurrence of at least one of the predetermined timing, the predetermined situation, and the predetermined scene or with a time elapsed from the start of the network game to occurrence of the predetermined event.

According to the present invention, the communication system can change the time period in which message transmission is allowed (or disallowed) during the progress of the network game. For example, after a long-lasting game ends with an exciting finish, a long time may be given to send a message.

Each of the communication apparatuses may further comprise:

a request accepting unit that accepts a request by the user for extension of the predetermined time period; and a request sending unit that sends the server information indicating the request accepted by the request accepting unit.

The server may further comprise a request receiving unit that receives the information indicating the request from the communication apparatuses.

The determining unit may further determine, based on a total number of the requests received by the request receiving unit as well as on a total number of the communication apparatuses connected to the network, whether or not to extend the predetermined time period.

The notice sending unit may resend, upon determination to extend by the determining unit, a disallowance notice, the notice indicating that transmission of the message data is disallowed, to communication apparatuses to which the disallowance notice was last sent.

According to the present invention, the communication system is enabled to extend the time period during which message transmission is allowed (disallowed) upon request. For example, when only the winning player is allowed to send a message for a predetermined time period and the talk of the wining player ends halfway before the end of the predetermined time period, other players can request continuation of the talk, and an extension can be made upon request by many players. For example, the communication system can be controlled so that when only the failing player is allowed to send a message for a predetermined time period and other players are not satisfied with what was said in the message, they can request an additional comment, and an extension can be made upon request by many players.

The distributing unit may distribute the message data to, of all the communication apparatuses, communication apparatuses other than the communication apparatus that has sent the message data received by the message receiving unit.

According to the present invention, at least to communication apparatuses other than the one that has sent message data, the server should distribute received message data. For example, in the case of real-time distribution of a message, the user who input the message does not listen to or see the message that the user input oneself. The user is exempt from the hassle of having to see input and output screens at one time and to listen to input and output sound at one time. For example, when a message is not distributed real-time, the user who has input the message is exempt from the hassle of having to again see or listen to the message that the user has input oneself. The server reduces the processing load for distributing message data.

A communication system according to another aspect of the present invention is a communication system comprising a server and a plurality of communication apparatuses connected with each other via a network, wherein the server comprises a determining unit, a notice sending unit, a message receiving unit, and a distributing unit; and the communication apparatuses each comprise a notice receiving unit, a message accepting unit, a message sending unit, and an output unit.

In the server, the determining unit determines whether to allow or disallow each of the plurality of communication apparatuses to send message data.

The notice sending unit sends an allowance notice, the notice indicating that transmission of the message data is allowed for a predetermined time period, to a communication apparatus that has been determined to be allowed by the determining unit, of all the plurality of communication apparatuses.

In each of the communication apparatuses, the notice receiving unit receives the disallowance notice from the server.

The message accepting unit accepts an input of the message data from a user when the notice receiving unit is in receipt of the allowance notice.

The message sending unit sends the server the message data accepted by the message accepting unit.

Further in the server, the message receiving unit receives the message data from the communication apparatuses.

The distributing unit distributes the message data received by the message receiving unit to each of the communication apparatuses.

Further in each of the communication apparatuses, the output unit outputs message data distributed by the server.

According to the present invention, the communication system receives messages from the users of the communication apparatuses and distributes the messages. Meanwhile, the communication system may allow only a specified communication apparatus to send a message and disallows the other communication apparatuses to do the same. A message from a specified apparatus can be conveyed to all of its intended destinations by giving the specified apparatus priority in message transmission over the other apparatuses.

For example, while a network game, chatting, or the like is in progress, all the participating players can be allowed to see or listen to comments, messages, or the like by a specified player. It can be done by notifying the one used by the specified player that input of a message is allowed and allowing only the specified player to make comments and write messages. For example, in a network game, when one player wins, the outcome of the game and messages from the players involved in the game can be readily known to the all the players by allowing only the winning or losing player to make comments or write messages. The players involved in the game may include not only the wining and losing players, but also key players of the game and players observing the game.

The message accepting unit may accept an input of the message data from the user when the notice receiving unit is in receipt of the allowance notice and a current time and date is in the predetermined time period indicated in the allowance notice.

For example, upon receipt of a notice that input of a message is allowed only for a predetermined time period by a communication apparatus, the user can input a message during the predetermined time period. The communication system can control one communication apparatus so that it is alternately allowed and disallowed to send a message.

A communication apparatus according to still another aspect of the present invention comprises an image storage unit, a notice receiving unit, a message accepting unit, a message sending unit, an output unit, and a display unit.

The image storage unit stores image data of a predetermined character object in association with each ID information of a plurality of communication apparatuses.

The notice receiving unit receives, from a server, a disallowance notice containing ID information of communication apparatuses that are disallowed to send message data.

The message accepting unit accepts an input of the message data from a user when the notice receiving unit is not in receipt of the disallowance notice.

The message sending unit sends the server the message data accepted by the message accepting unit.

The output unit outputs message data distributed by the server.

The display unit displays each of the image data of the predetermined character object stored in the image storage unit in a predetermined display format when the notice receiving unit is not in receipt of the disallowance notice and highlights and displays image data corresponding to the ID information contained in the disallowance notice when the notice receiving unit is in receipt thereof.

According to the present invention, the communication apparatus can clearly inform the users which communication apparatus is currently allowed or disallowed to send a message by changing the display format of the image assigned in advance to each communication apparatus. For example, the users can be informed which communication apparatus is allowed or disallowed by displaying relatively large the image corresponding to a communication apparatus that is allowed to send a message. The users can be also informed of allowance and disallowance by differentiating a motion image indicating the allowed condition from motion images indicating the disallowed condition and displaying these images.

A communication server according to still further another aspect of the present invention comprises a determining unit, a notice sending unit, a message receiving unit, and a distributing unit.

The determining unit determines whether to allow or disallow each of communication apparatuses connected via a network to send message data.

The notice sending unit sends a disallowance notice, the notice indicating that transmission of the message data is disallowed for a predetermined time period, to communication apparatuses that have been determined to be disallowed by the determining unit.

The message receiving unit receives the message data from a communication apparatus that has been determined to be allowed by the determining unit.

The distributing unit distributes the message data received by the message receiving unit to each of the communication apparatuses.

According to the present invention, the communication server can prioritize a message from a specified communication apparatus for receipt and distribution thereof. For example, to convey game information sent from a specified user, such as comments on the outcome of the game, to the other users, the communication server notifies the communication apparatuses other than the one used by the specified user that message transmission is disallowed for a predetermined time period. Then the commutation server thereby receives the game information only from the one used by the specified user and distributes the same to the other communication apparatuses. During the predetermined time period, the communication apparatuses other than that of the specified user are disallowed to send messages and only receive game information therefrom. The users using the other communication apparatuses can acquire game information from the user using the specified communication apparatus.

A communication method according to yet still further another aspect of the present invention comprises a notice receiving step, a message accepting step, a message sending step, an output step, and a display step.

Image data of a predetermined character object is stored in an image storage unit in association with each ID information of a plurality of communication apparatuses.

In the notice receiving step, a disallowance notice containing ID information of communication apparatuses that are disallowed to send message data is received from a server.

In the message accepting step, an input of the message data is accepted from a user when the disallowance notice is not received in the notice receiving step.

In the message sending step, the message data accepted in the message accepting step is sent to the server.

In the output step, message data distributed from the server is output.

In the display step, each of the image data of the predetermined character object stored in the image storage unit is displayed in a predetermined display format when the disallowance notice is not received in the notice receiving step, and image data corresponding to the ID information contained in the disallowance notice is highlighted and displayed when the disallowance notice is received therein.

According to the present invention, a communication apparatus can clearly inform the user which communication apparatus is currently allowed or disallowed to send a message by changing the display format of the image assigned in advance to each communication apparatus. For example, the users can be informed which communication apparatus is allowed or disallowed by displaying relatively large the image corresponding to a communication apparatus that is allowed to send a message. Also, the users can be informed of allowance and disallowance by differentiating a motion image indicating the allowed condition from motion images indicating the disallowed condition and displaying these images.

A communication method according to yet still further another aspect of the present invention comprises a determining step, a notice sending step, a message receiving step, and a distributing step.

In the determining step, whether to allow or disallow each of communication apparatuses connected via a network to send message data is determined.

In the notice sending step, a disallowance notice, the notice indicating that transmission of the message data is disallowed for a predetermined time period, is sent to communication apparatuses that have been determined to be disallowed by the determining unit in the determining step.

In the message receiving step, the message data is received from a communication apparatus that has been determined to be allowed in the determining step.

In the distributing step, the message data received in the message receiving step is distributed to each of the communication apparatuses.

According to the present invention, the communication server can prioritize a message from a specified communication apparatus for receipt and distribution thereof. For example, to convey game information sent from a specified user, such as comments on the outcome of the game, to the other users, the communication server notifies the communication apparatuses other than the one used by the specified user that message transmission is disallowed for a predetermined time period. Then the commutation server thereby receives the game information only from the one used by the specified user and distributes the same to the other communication apparatuses. During the predetermined time period, the communication apparatuses other than that of the specified user are disallowed to send messages and only receive game information therefrom. The users using the other communication apparatuses can acquire game information from the user using the specified communication apparatus.

The computer-readable information storage medium according to yet still further another aspect of the present invention stores a program that causes a computer to act as an image storage unit, a notice receiving unit, a message accepting unit, a message sending unit, an output unit, and a display unit.

An image storage unit stores image data of a predetermined character object in association with each ID information of a plurality of communication apparatuses.

The notice receiving unit receives, from a server, a disallowance notice containing ID information of communication apparatuses that are disallowed to send message data.

The message accepting unit accepts an input of the message data from a user when the notice receiving unit is not in receipt of the disallowance notice.

The message sending unit sends the server the message data accepted by the message accepting unit.

The output unit outputs message data distributed by the server.

The display unit displays each of the image data of the predetermined character object stored in the image storage unit in a predetermined display format when the notice receiving unit is not in receipt of the disallowance notice and highlights and displays image data corresponding to the ID information contained in the disallowance notice when the notice receiving unit is in receipt thereof.

According to the present invention, the computer acts as a communication apparatus that can clearly inform its user which computer is currently allowed or disallowed to send a message by changing the display format of the image assigned in advance to each computer. For example, the users can be informed which communication apparatus is allowed or disallowed by displaying relatively large the image corresponding to a communication apparatus that is allowed to send a message. Also, the users can be informed of allowance and disallowance by differentiating a motion image indicating the allowed condition from motion images indicating the disallowed condition and displaying these images.

A computer-readable information storage medium according to yet still further another aspect of the present invention stores a program that causes a computer to act as a determining unit, a notice sending unit, a message receiving unit, and a distributing unit.

The determining unit determines whether to allow or disallow each of communication apparatuses connected via a network to send message data.

The notice sending unit sends a disallowance notice, the notice indicating that transmission of the message data is disallowed for a predetermined time period, to communication apparatuses that have been determined to be disallowed by the determining unit.

The message receiving unit receives the message data from a communication apparatus that has been determined to be allowed by the determining unit.

The distributing unit distributes the message data received by the message receiving unit to each of the communication apparatuses.

According to the present invention, the computer acts as a communication server that can prioritize a message from a specified communication apparatus for receipt and distribution thereof. For example, to convey game information sent from a specified user, such as comments on the outcome of the game, to the other users, the communication server notifies the communication apparatuses other than the one used by the specified user that message transmission is disallowed for a predetermined time period. Then the commutation server thereby receives game information only from the one used by the specified user and distributes the same to the other communication apparatuses. During the predetermined time period, the communication apparatuses other than that of the specified user are disallowed to send messages and only receive game information therefrom. The users using the other communication apparatuses can acquire game information from the user using the specified communication apparatus.

A program according to yet still further another aspect of the present invention causes a computer to act as an image storage unit, a notice receiving unit, a message accepting unit, a message sending unit, an output unit, and a display unit.

An image storage unit stores image data of a predetermined character object in association with each ID information of a plurality of communication apparatuses.

The notice receiving unit receives, from a server, a disallowance notice containing ID information of communication apparatuses that are disallowed to send message data.

The message accepting unit accepts an input of the message data from a user when the notice receiving unit is not in receipt of the disallowance notice.

The message sending unit sends the server the message data accepted by the message accepting unit.

The output unit outputs message data distributed by the server.

The display unit displays each of the image data of the predetermined character object stored in the image storage unit in a predetermined display format when the notice receiving unit is not in receipt of the disallowance notice and highlights and displays image data corresponding to the ID information contained in the disallowance notice when the notice receiving unit is in receipt thereof.

According to the present invention, the computer acts as a communication apparatus that can clearly inform its user which computer is currently allowed or disallowed to send a message by changing the display format of an image assigned in advance to each computer. For example, the users can be informed which communication apparatus is allowed and disallowed by displaying relatively large the image corresponding to a communication apparatus that is allowed to send a message. Also, the users can be informed of allowance and disallowance by differentiating a motion image indicating the allowed condition from motion images indicating the disallowed condition and displaying these images.

A program according to yet still further another aspect of the present invention causes a computer to act as a determining unit, a notice sending unit, a message receiving unit, and a distributing unit.

The determining unit determines whether to allow or disallow each of communication apparatuses connected via a network to send message data.

The notice sending unit sends a disallowance notice, the notice indicating that transmission of the message data is disallowed for a predetermined time period, to communication apparatuses that have been determined to be disallowed by the determining unit.

The message receiving unit receives the message data from a communication apparatus that has been determined to be allowed by the determining unit.

The distributing unit distributes the message data received by the message receiving unit to each of the communication apparatuses.

According to the present invention, the computer acts as a communication server that can prioritize a message from a specified communication apparatus for receipt and distribution thereof. For example, to convey game information sent from a specified user, such as comments on the outcome of the game, to the other users, the communication server notifies the communication apparatus other than the one used by the specified user that message transmission is disallowed for a predetermined time period. Then the commutation server thereby receives game information only from the one used by the specified user and distributes the same to the other communication apparatuses. During the predetermined time period, the communication apparatuses other than that of the specified user are disallowed to send messages and only receive game information therefrom. The users using the other communication apparatuses can acquire game information from the user using the specified communication apparatus.

The program according to the present invention may be stored in a computer-readable information storage medium, such as a compact disk, a flexible disk, a hard disk, a magnetic optical disk, a digital video disk, a magnetic tape, and a semiconductor memory.

The foregoing program may be distributed and sold via a computer communication network, separately from a computer on which it is to be executed. As well, the computer-readable information storage medium may be sold and distributed separately from a computer.

Effect of the Invention

According to the present invention, the players can be readily informed of game information during the progress of the game.

EXPLANATION OF REFERENCE NUMERALS

Figure 1:
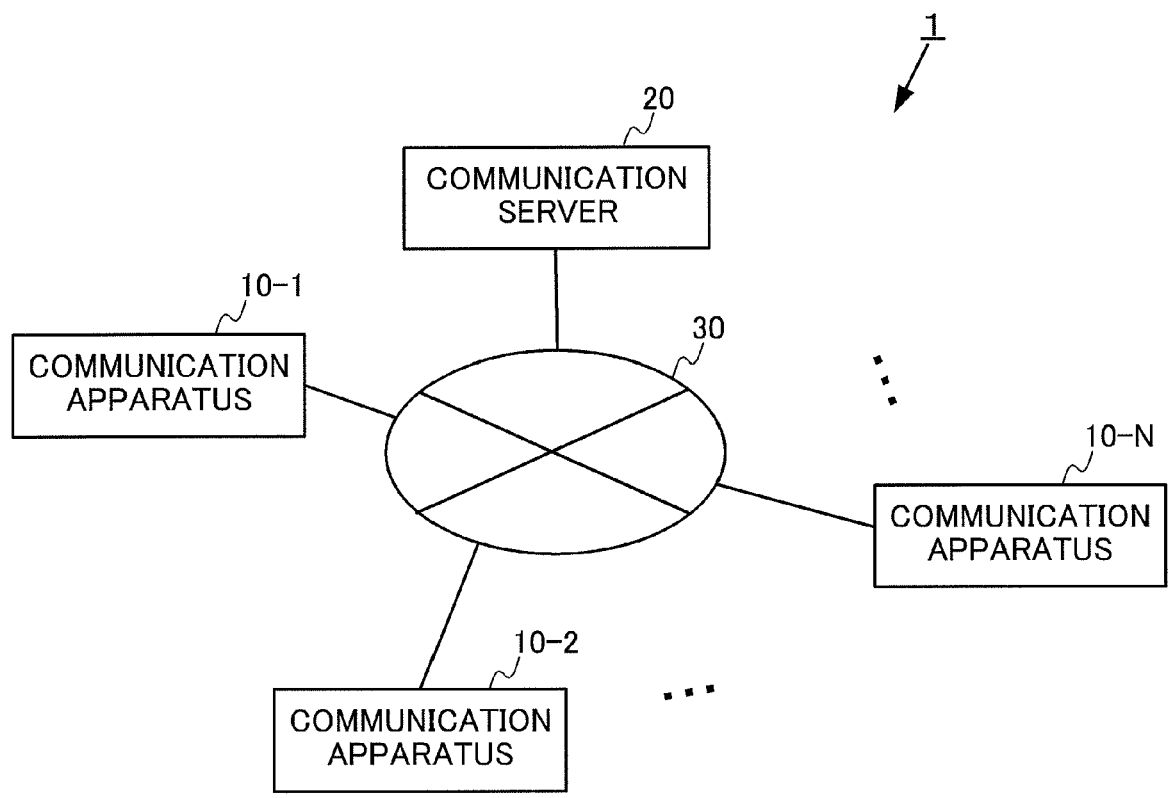
FIG. 1 is a diagram illustrating a configuration of a communication system according to an embodiment of the present invention.

1 communication system
10 communication apparatus
20 communication server
30 communication network
101 CPU
102 ROM
103 RAM
104 interface
105 controller
106 external memory
107 DVD-ROM drive
108 image processor
109 sound processor
110 NIC
201 control unit
202 communication unit
203 storage unit
401 determining unit
402 notice sending unit
403 notice receiving unit
404 message accepting unit
405 message sending unit
406 message receiving unit
407 distributing unit
408 output unit
901 operation input accepting unit
902 operation input sending unit
903 operation input receiving unit 1001 image storage unit
1201 request accepting unit
1202 request sending unit
1203 request receiving unit

BEST MODE FOR CARRYING OUT THE INVENTION

Embodiment 1

FIG. 1 is a diagram illustrating a configuration of a communication system 1 of this embodiment. The communication system 1 has N (an integer greater than or equal to 1) communication apparatuses 10 (denoted by 10-1, 10-2, and 10-N in the figure) and a communication server 20. The communication apparatus 10 is a terminal device that each user operates. For example, when playing a network game via the communication system 1, one player normally operates one communication apparatus 10. The communication server 20 is a server that performs overall management of the communication system 1, including user (player) authentication and the progress management of the network game. The communication apparatus 10 and the communication server 20 are connected to each other via a communication network 30. In this embodiment, the communication network 30 is the Internet, but another communication means, such as the LAN (Local Area Network) or the WAN (Wide Area Network), may be used as well.

For example, users can operate the communication apparatuses 10 to play a network game, such as an online baseball game, and to converse via a messaging system—the so-called chat system using text, voice, images, and the like. The communication server 20 receives message data sent from each of the communication apparatuses 10 comprised in the communication system 1 and distributes the message data to each of the communication apparatuses 10.

Figure 2:
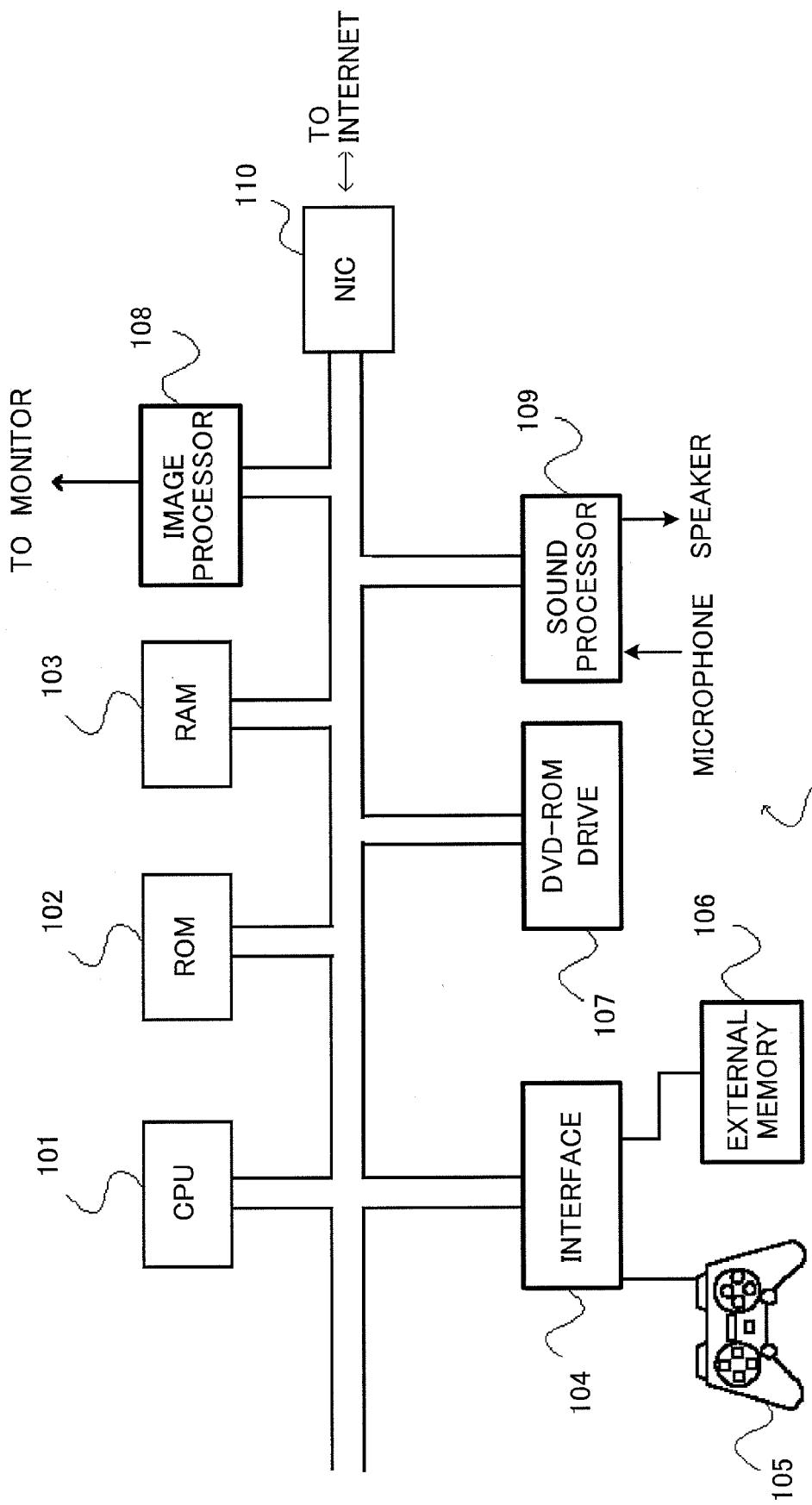
FIG. 2 is a diagram illustrating a general configuration of a typical gaming device in which a communication apparatus according to the embodiment is achieved.

FIG. 2 is a diagram illustrating a general configuration of a typical gaming device in which the communication apparatus 10 according to this embodiment of the present invention is achieved. The communication apparatus 10 comprises a CPU (Central Processing Unit) 101, a ROM (Read Only Memory) 102, a RAM (Random Access Memory) 103, an interface 104, a controller 105, an external memory 106, a DVD (Digital Versatile Disk)-ROM drive 107, an image processor 108, a sound processor 109, and an NIC (Network Interface Card) 110.

By mounting, on the DVD-ROM drive 107, a DVD-ROM storing the program and data for the game and turning on the power of the communication apparatus 10, the program is launched, and the communication apparatus 10 according to this embodiment is achieved.

The CPU 101 controls overall operation of the communication apparatus 10 and is connected to other components for exchanging control signals and data. For example, the CPU 101 controls the components to perform transmission of message data input by the user to the communication server 20 and receipt of message data sent by another communication apparatus 10 from the communication server 20 (hereinafter referred to as the "communication process"). The details are discussed below.

In the ROM 102, an Initial Program Loader (IPL), which is executed immediately after the power is turned on, is recorded. Upon execution of the IPL, the program recorded in the DVD-ROM is read out to the RAM 103, and execution by the CPU 101 starts. Data and programs of the operating system (OS) required for overall control and operation of the gaming device 100 are recorded in the ROM 102.

The RAM 103 is used for temporary storage of data and programs. The RAM 103 holds the data and programs read out from the DVD-ROM as well as other data needed for the progress of the game and chat communications.

The controller 105, which is connected via the interface 104, accepts a manipulation input from the user for game play. For example, provided on the controller 105 are buttons A, B, X, and Y and directional buttons indicating four respective directions (directional key). As the user presses one of these buttons, the manipulation input associated with the pressed button is accepted.

The external memory 106 is detachably connected via the interface 104. Data rewritably recorded in the external memory 106 include data on the progress of the game and logs (records) of chat communications. The user can appropriately record such data in the external memory 106 by inputting instructions via the controller 105.

In a DVD-ROM to be mounted on the DVD-ROM drive 107, a program for executing the game as well as image and sound data that accompany therewith are recorded. Under control of the CPU 101, the DVD-ROM drive 107 reads out, from the DVD-ROM mounted thereon, a required program and data. The program and data are stored temporarily in the RAM 103, etc.

The image processor 108, upon processing of the data read out from the DVD-ROM and received message data containing text and images by an image operation processor (not shown) comprised in the image processor 108 and the CPU 101, records the data in a frame memory (not shown) comprised in the image processor 108. The image information recorded in the frame memory is converted into video signals at a predetermined synchronization timing and output to a monitor (not shown) connected to the image processor 108. Many kinds of image display are thereby enabled.

The image operation processor can perform overlay calculation for 2D images, transparent operations (alpha blending, etc.), and many kinds of saturate calculation at high speeds.

It is also possible to perform a high-speed operation to acquire a rendering image from information on a polygon, which is arranged within a virtual 3D space and to which various kinds of texture information are added. In such an operation, the Z buffer method is used for rendering the information on the polygon to acquire the rendering image in which the polygon in a virtual 3D space can be seen from a predetermined viewpoint position.

Further, by cooperation of the CPU 101 and the image operation processor, a string can be rendered as a 2D image in the frame memory or on each polygon surface according to font information defining text shapes. The font information is recorded in the ROM 102, but dedicated font information recorded in the DVD-ROM can be used as well.

The sound processor 109 converts, into an analog sound signal, sound data read out from the DVD-ROM and received sound message data and outputs the sound signal from a speaker (not shown) connected thereto. Under control of the CPU 101, the sound processor 109 creates sound effects and music data to be played during the progress of the game and outputs sounds equivalent thereto from the speaker. Also under control of the CPU 101, the sound processor 109 converts sound gathered by a microphone (not shown) into a digital sound signal to create sound data.

The NIC 110 is used for connecting the communication apparatus 10 to the communication network 30 (not shown), such as the Internet. The NIC 110 comprises ones compliant with the 10 BASE-T/100 BASE-T standard which is used to configure a LAN (Local Area Network), an analog modem for Internet connection via a telephone circuit, an ISDN (Integrated Services Digital Network) modem, an ADSL (Asymmetric Digital Subscriber Line) modem, a cable modem for Internet connection via a cable television circuit and the like, and an interface (not shown) which intervenes between these modems and the CPU 101.

In addition, the communication apparatus 10 may employ a large-capacity external storage device, such as a hard disk, so that the communication apparatus 10 has the functions equal to those of the ROM 102, the RAM 103, the external memory 106, a DVD-ROM mounted on the DVD-ROM drive 107, and the like. It is also possible to adopt an embodiment in which a keyboard for accepting user inputs for editing strings and a mouse for accepting user inputs for making selections and indicating positions are connected.

In lieu of the communication apparatus 10 according to this embodiment, an ordinary computer (a general personal computer, etc.) can be used as a communication apparatus. For example, as in the case of the communication apparatus 10, an ordinary computer comprises a CPU, a RAM, a ROM, a DVD-ROM drive, an NIC, an image processor with features not as advanced as those of the communication apparatus 10, and a hard disk as an external storage device. It is also designed to be able to use a flexible disk, a magnetic optical disk, a magnetic tape, etc. Input devices that can be employed include not a controller, but a keyboard and a mouse. When the game program is executed subsequent to installation thereof, the computer acts as the communication apparatus.

Figure 3:
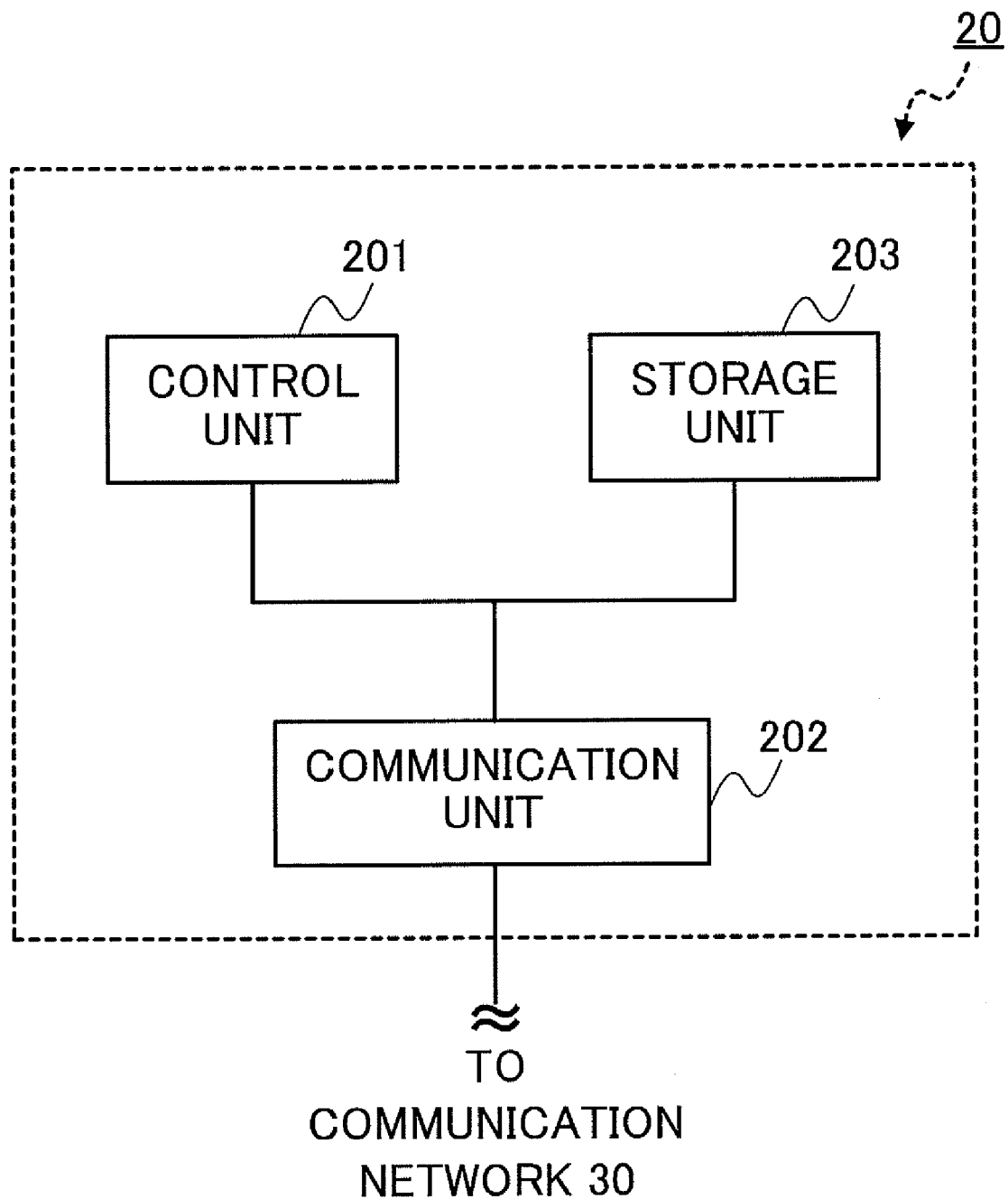
FIG. 3 is a diagram illustrating a general configuration of a communication server according to the embodiment.

FIG. 3 is a diagram illustrating a general configuration of the communication server 20 according to this embodiment. The communication server 20 comprises a control unit 201, a communication unit 202, and a storage unit 203.

The control unit 201, which comprises a CPU, controls components of the communication server 20 according to an OS, a program, or the like stored in the storage unit 203. For example, the control unit 201 controls the communication unit 202 to distribute message data sent from the communication apparatus 10 to each of the communication apparatuses 10 comprised in the communication system 1.

The communication unit 202 comprises specific communication devices, such as a NIC, a router, and a modem. Under control of the control unit 201, the communication unit 202 communicates with each of the communication apparatuses 10 connected to the communication network 30.

The storage unit 203 comprises a hard disk device and other storage devices such as a RAM, which acts as a work area, and a ROM. For example, in the storage unit 203, a program and an OS for overall control of the communication server 20 are stored in a ROM, and the foregoing received message data and the like are stored in a hard disk device or a RAM.

According to this embodiment, the communication server 20 manages the progress of a network game played via the communication network 30. However, an unillustrated game server may be configured to manage the progress of a network game. The contents of the network game are not restricted in the present invention. Even an optional communication service for a plurality of users, such as SNS (Social Networking Service), which is not a game, may be provided.

Figure 4:
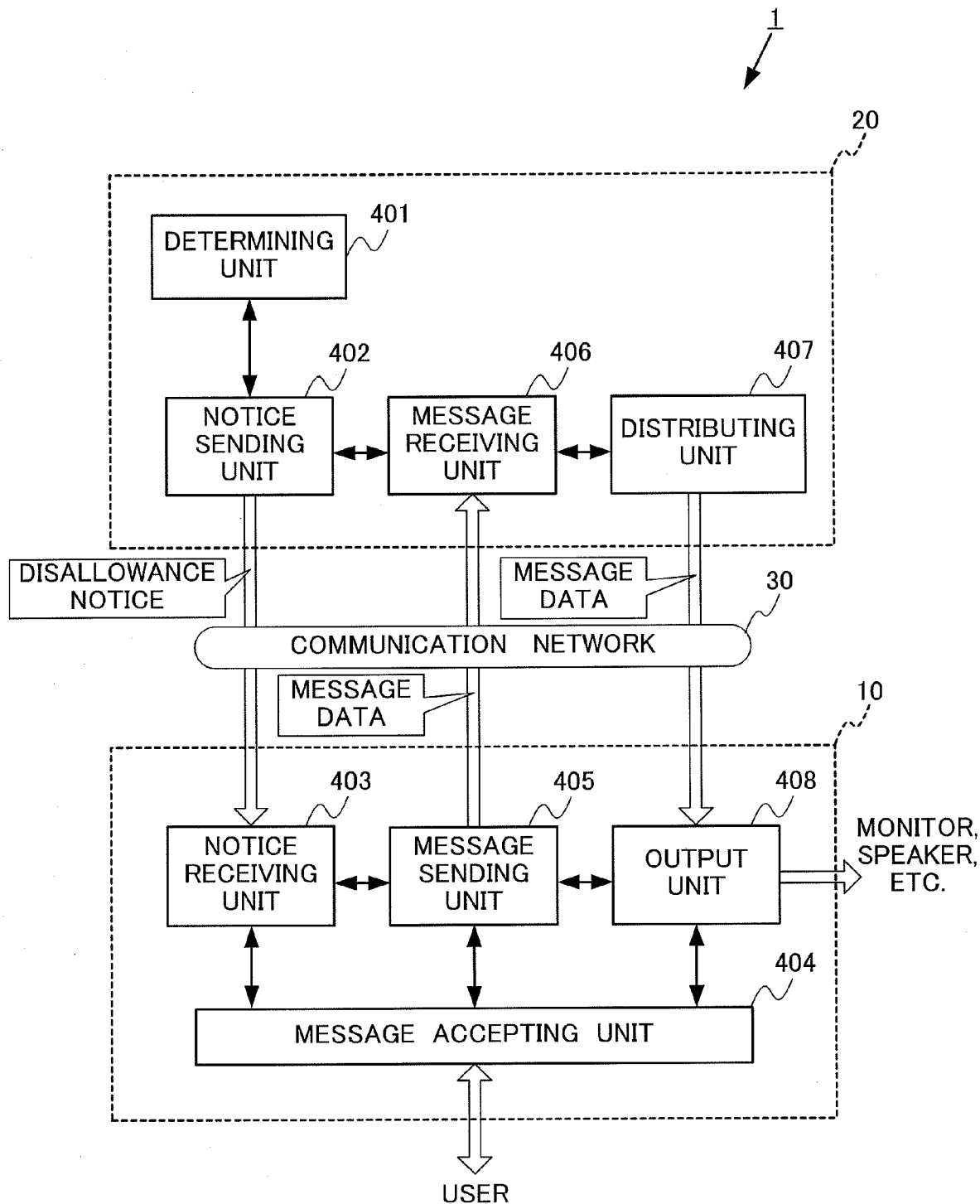
FIG. 4 is a diagram for explaining functional configurations of the communication apparatus and the communication server.

Next, general functional configurations of the communication apparatus 10 and the communication server 20 according to this embodiment are explained using FIG. 4. Each communication apparatus 10 accepts a message data input from a user and send the message data to the communication server 20, while executing a network game in a virtual space. Also, the communication server 20 distributes the message data to the communication apparatuses 10 that are designated as destinations. In the text to follow, each player of the network game is assumed as a user of the communication apparatus 10.

In this figure, only one communication apparatus 10 and one communication server 20 are described for the ease of understanding of the present invention. However, a plurality of the communication apparatuses 10 and a plurality of the communication servers 20 may be comprised. To comprise a plurality of the communication servers 20, each communication server 20 needs to synchronize, at a predetermined time interval, various types of information stored in the storage unit 203.

Message data comprises data containing at least one of arbitrary text data, image data, and sound data. Methods for distributing message data include the uni-cast, multi-cast, and broadcast methods. In the uni-cast method, a player P1 operates a communication apparatus 10-1 to send message data to a communication apparatus 10-2 operated by a player P2. In the multi-cast method, the player P1 operates the communication apparatus 10-1 to send message data to communication apparatuses 10-2, 10-3 . . . , operated respectively by a plurality of other players P2, P3 . . . . In the broadcast system, the player P1 operates the communication apparatus 10-1 to send message data to communication apparatuses 10-1, 10-2, . . . , 10-N, each of which is operated by one of the players. Here, for the ease of understanding of the present invention, broadcast distribution of message data to each of the communication apparatuses 10 operated by the players participating in the network game is used as an example for explanation. However, the present invention is not limited to the broadcast system. Other distributions systems, such as uni-cast and multi-cast, may be adopted as well.

The communication server 20 comprises a determining unit 401, a notice sending unit 402, a message receiving unit 406, and a distributing unit 407. The communication apparatus 10 comprises a notice receiving unit 403, a message accepting unit 404, a message sending unit 405, and an output unit 408. For the ease of understanding of the processes performed by these units, each configuration is explained in the order of the communication processes performed by the communication system 1.

The determining unit 401 determines whether each of the communication apparatuses 10 should be allowed or disallowed to send message data. The communication apparatuses 10 can send message data input by the user to the communication server 20. However, it does not mean that the communication apparatuses 10 can unconditionally send message data at any timing during the execution of the network game. The determining unit 401 determines a timing at which each of the communication apparatuses 10 is allowed or disallowed to send message data. In this context, the control unit 201 acts as the determining unit 401.

For example, in a Mah-jong game, when a player makes a move—such as call, win, draw, pung, chow, or kong—data message transmission from only the communication apparatus 10 operated by that player is allowed. The communication apparatuses 10 operated by the other players are disallowed to send message data. Conversely, it may be determined that only the communication apparatus 10 operated by the player who is affected by such a move—e.g., the losing player (the player who discarded the game winning tile)—may be allowed to send data message and that the communication apparatuses 10 operated by the other players are disallowed to perform data message transmission.

Possible examples in a baseball game include situations where: the team of a player or a player character scores (or gives up) a run(s) by home run, comes from behind (allows the opponent to come behind) to take a lead, ties the score (allows the opponent to tie the score), and makes a big play, an error, and a player substitution. In these situations, it is determined that message data transmission from only the communication apparatus 10 operated by the player having made one of these moves is allowed and that message transmission from the communication apparatuses 10 of the other players is disallowed. Allowance and disallowance can be determined upon occurrence of an arbitrary event during the game.

For example, during a succor game, message data transmission from the communication apparatus 10 operated by a player of the leading (or trailing) team at the halftime is allowed, and the communication apparatus 10 operated by a player of the opponent team is disallowed. It may be determined to allow or disallow message transmission during a certain pre-game or post-game time period.

An example situation in the group rope jumping game is where the character operated by a certain player makes a mistake and is stuck with a rope. In this situation, it is determined that message data transmission from the communication apparatus 10 of the player of the character having made the mistake is allowed and that message data transmission from the communication apparatuses 10 operated by the other players is disallowed.

An example situation in a music game is where a plurality of players are teamed up for a session for playing music for competition, and a certain player makes a mistake. In this situation, it is determined that message data transmission from the communication apparatus 10 of the player having made the mistake is allowed and that message data transmission from the communication apparatuses 10 operated by the other players is disallowed. Also, it may be determined that message data transmission from the communication apparatus 10 of the player having been given the highest score is allowed and that message data transmission from the communication apparatuses 10 operated by the other players is disallowed.

As described above, the determining unit 401, at a predetermined timing, in a predetermined situation, or upon appearance of a predetermined scene or occurrence of a predetermined event of a network game, allows message data transmission from a certain communication apparatus 10 and disallows message data transmission from the other communication apparatuses 10. The contents of the game are not limited in the present invention.

Of the communication apparatuses 10 comprised in the communication system 1, the notice sending unit 402 sends a disallowance notice to the ones whose message transmission has been disallowed by the determining unit 401 so as to notify to that they are disallowed to send message data. The control unit 201 controls the communication unit 202 to produce a packet including a disallowance notice and send the notice to the communication apparatuses 10 whose message data transmission has been determined to be disallowed by the control unit 201. In this way, the control unit 201 and the communication unit 202 cooperate to act as the notice sending unit 402.

The disallowance notice contains information on a predetermined time period during which message data transmission is disallowed (disallowed time period). For example, the disallowed time period is specified as "for X second(s) after receipt (or transmission) of a disallowance notice", "from time T1 to time T2", or the like. The disallowed time period may be either a fixed value or a variable one. More specifically, the notice sending unit 402 may set different disallowed time periods for different timings, situations, scenes, events, and the like of a network game. The disallowed time period may also be set to an unspecified time period, such as "by the time when a predetermined event next occurs". To set the disallowed time period to a fixed value, a disallowance notice does not have to contain information on the disallowed time period.

The notice receiving unit 403 receives a disallowance notice from the communication server 20 and inputs the received disallowance notice to the message accepting unit 404. More specifically, the NIC 110 receives a packet containing a disallowance notice, and the CPU 101 analyzes the packet and acquires the disallowance notice. The CPU 101 temporarily stores the disallowance notice in the RAM 103 by associating it with the date and time of the receipt thereof. The CPU 101, the RAM 103, and the NIC 110 cooperate to act as the notice receiving unit 403.

When the notice receiving unit 403 is not in receipt of a disallowance notice, the message accepting unit 404 accepts an input of message data from a player (user). More specifically, the CPU 101 determines whether a disallowance notice has been received from the communication server 20. Upon determination that it has not been received, the interface 104 receives message data from the controller 105 and inputs the message data to the CPU 101. Upon determination by the CPU 101 that a disallowance notice has not been received, the sound processor 109 converts sound gathered by a microphone into digital data and input the sound to the CPU 101. When the communication apparatus 10 is not in receipt of a disallowance notice, the player operating that communication apparatus 10 can send a message to other players.

Also, upon lapse of the foregoing predetermined time period after a disallowance notice is last received from the communication server 20, the message accepting unit 404 accepts an input of message data from players. In other words, even when the communication apparatus 10 is in receipt of a disallowance notice, players can send a message upon lapse of a predetermined time period after the receipt thereof. In this way, the CPU 101, the interface 104, and the sound processor 109 cooperate to act as the message accepting unit 404.

Players may use the controller 105 to input arbitrary letters, numerals, notations, images, and the like as message data and to input sound as message data using a microphone. In a configuration according to this embodiment, players are allowed not only to input letters and the like using the controller 105, but also to input sound using a microphone. However, it is possible to configure so that input can be made using only the controller 105 or a microphone. Also, the communication apparatus 10 may further comprise a camera for photographing or video recording the player or the like, so that a still or moving image photographed or video recorded by the camera can be input as message data.

The message sending unit 405 sends the communication server 20 message data that the message accepting unit 404 has accepted from a user. More specifically, the CPU 101 produces a packet by encrypting, according to a predetermined encryption algorithm, message data—such as text data, image data, and sound data—and the ID information of the sender communication apparatus 10. Then the CPU 101 controls the NIC 110 to send the packet to the communication server 20. The ID information contains the terminal number, the terminal name, the IP (Internet Protocol) address, and the MAC (Media Access Control) address that are in advance assigned to the communication apparatus 10 or the membership number, the user name, the nickname, the email address, and the like of the player. These types of information are in advance stored in the external memory 106, the RAM 103, or the like. The encryption method and the data format are not limited in the present invention. In this way, the CPU 101 and the NIC 110 cooperate to act as the message sending unit 405.

There may be a situation where message data is sent not to all the communication apparatuses 10 operated by the players in a network game, but only to the communication apparatus 10 operated by a specific player or to the communication apparatus 10 operated by a player belonging to a specific group. In such a situation, information on the destination (ID information of the communication apparatus 10 to which message data is sent), which is associated with message data, should be further sent by the message sending unit 405.

The message receiving unit 406 receives message data from the communication apparatus 10. More specifically, the communication unit 202 receives a packet containing the message data, and the control unit 201 analyzes and decrypts the packet and acquires the message data. The control unit 201 causes the storage unit 203 to store the acquired message data. For example, the control unit 201 causes the storage unit 203 to store the received message data, the received time and date, and the foregoing ID information of the sender of the received message data so that they are in association with each other. In the storage unit 203, message data received from each of the communication apparatuses 10 are stored. The control unit 201, the communication unit 202, and the storage unit 203 cooperate to act as the message receiving unit 406.

The distributing unit 407 distributes the message data received by and stored in the message receiving unit 406 to each of the communication apparatuses 10. The control unit 201 reads out the message data received by and stored in the storage unit 203, produces a packet containing the read out message data, and controls the communication unit 202 to send the packet to each of the communication apparatuses 10. When the destination is specified, the message is sent to the specified destination only. In this embodiment, message data is distributed simultaneously to each of the communication apparatuses 10 operated by the players participating in the network game. In this way, the control unit 201, the communication unit 202, and the storage unit 203 cooperate to act as the distributing unit 407.

Here, the distributing unit 407 may be configured to send message data received from the message receiving unit 406, not to the communication apparatus 10 that is the sender of the message data, but to the communication apparatuses 10 other than the sender communication apparatus 10. For example, the distributing unit 407 acquires ID information of the sender stored in association with the received message data in the storage unit 203. Of the communication apparatuses 10 that are connected to the communication network 30, the distributing unit 407 sends message data to ones other than the sender communication apparatus 10 indicated by the acquired ID information. More specifically, the distributing unit 407 at least has to distribute the received message data to the communication apparatuses 10 other than the communication apparatus 10 that has sent the received message, and the distributing unit 407 does not have to send the same message to the sender communication apparatus 10.

For example, when a voice message is distributed real-time as in voice chat or when a video message is distributed real-time, a user who inputs a voice or video message does not always have to again listen to or watch the voice or video that the user has distributed. The user can avoid a hassle of having to listen to or watch his/her own message again. The server can reduce the load of distribution processing by limiting the destination of the distributed message data.

The distributing unit 407 monitors whether there is unsent message data and, if any, sends the unsent message data to each of the communication apparatuses 10. As the distributing unit 407 performs this process repeatedly, the message data is distributed on the basis of FIFO (First In First Out).

The output unit 408 receives message data distributed from the communication server 20 and outputs the received message data to the monitor, the speaker, or the like. More specifically, the CPU 101 analyzes a packet containing message data received by the NIC 110 and acquires the message data. If the message data is text data or image data, the text or the image is displayed on the monitor by the image processor 108. If the message data is sound data, the sound is output to the speaker by the sound processor 109. The CPU 101, the image processor 108, the sound processor 109, and the NIC 110 cooperate to act as the output unit 408.

(Registration of Message Data)

Figure 5:
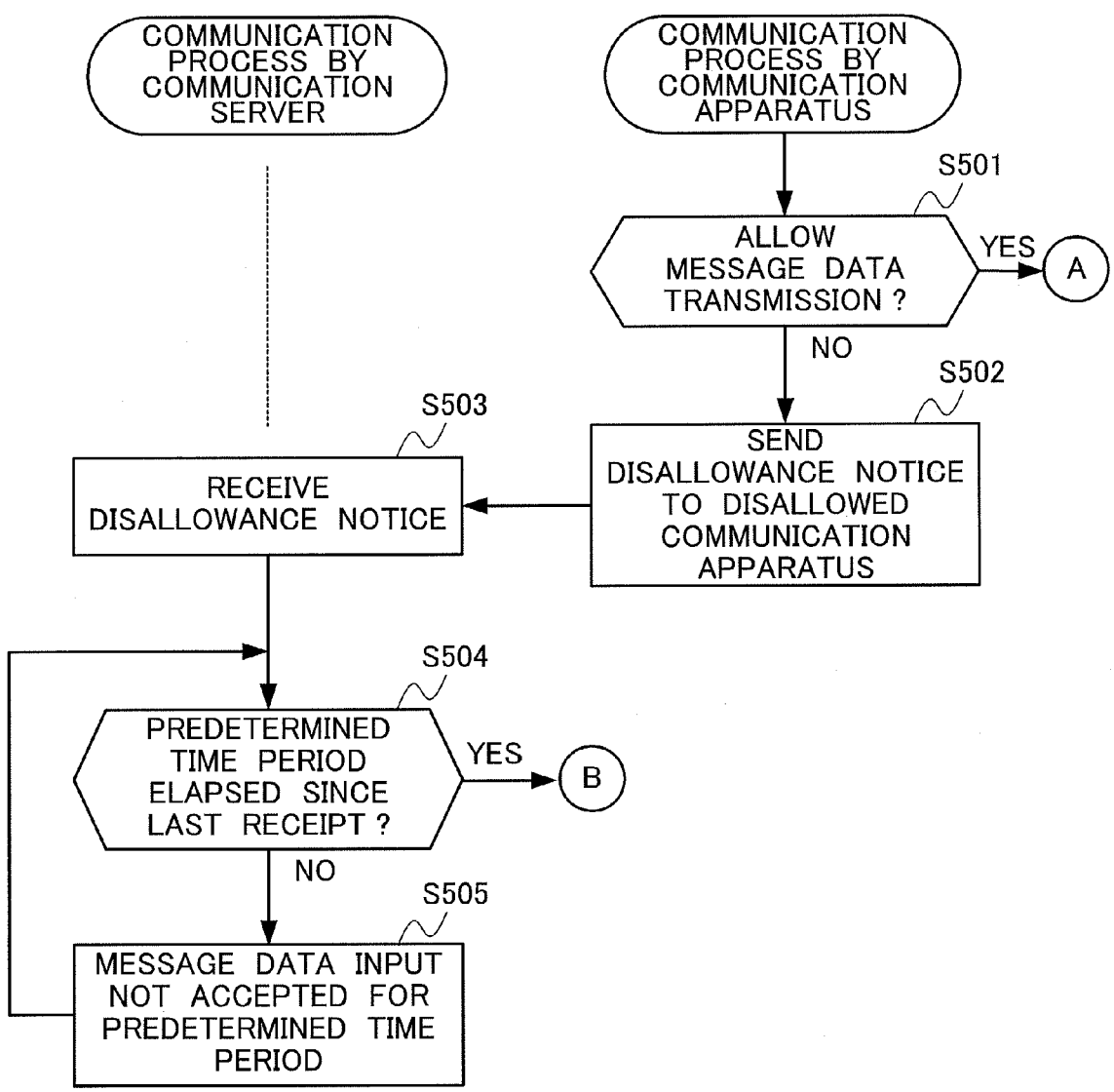
FIG. 5 is a flowchart for explaining a communication process of the communication apparatus and the communication server.
Figure 6:
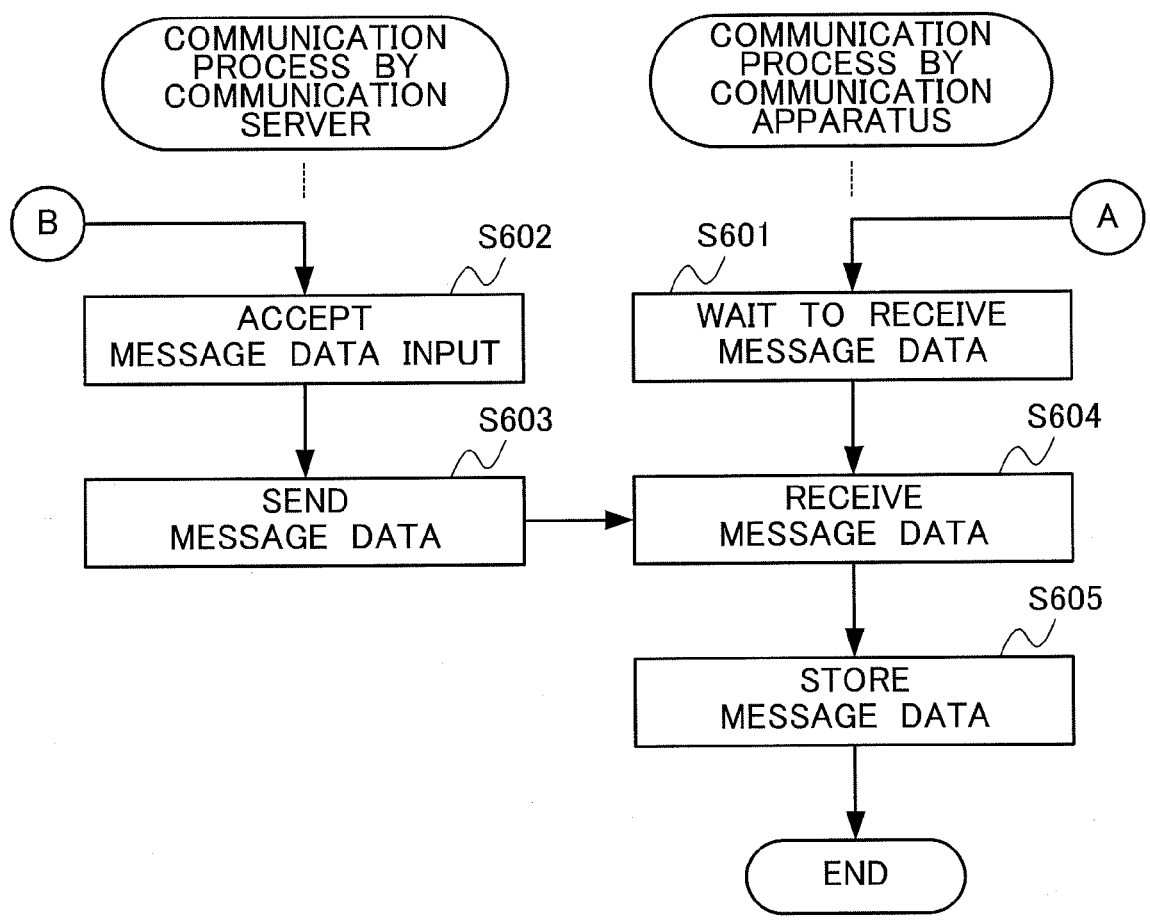
FIG. 6 is a flowchart for explaining the communication process of the communication apparatus and the communication server (cont.).

A process of sending message data by each of the communication apparatuses 10 to the communication server 20 is next explained using the flowcharts in FIGS. 5 and 6. For example, the communication apparatus 10 accepts an input of message data from a user during a network game and send the message data to the communication server 20. The communication server 20 is registered with message data to be distributed to each of the communication apparatus 10. The explanation below assumes that each of the communication apparatus 10 executes a network Mah-jong game and that the communication server 20 receives and distributes messages from the players participating in the Mah-jong game.

During the Mah-jong game, at a predetermined timing, in a predetermined situation, or upon appearance of a predetermined scene or occurrence of a predetermined event, the determining unit 401 of the communication server 20 determines whether to allow or disallow message data transmission by each of the communication apparatuses 10 (step S501). For example, the determining unit 401 determines that when one of the players wins the Mah-jong game, data message transmission from only the communication apparatus 10 operated by the winning player is allowed and that data message transmission from the communication apparatuses 10 operated by the other players is disallowed.

When a plurality of winning players exist, all the winning players may be allowed to send message data. The priority for message data transmission may set based on the relationship between the winning players (whether the player is a dealer or non-dealer), the all-time results or the winning percentage of each player, or the like, so that the player with the highest priority is allowed to send message data.

The "players other than the winning player" are disallowed to send message data. Such players include the losing players (i.e., the players who discarded the game winning tile or lost points) as well as an observing player who only observes the game and does not actually play or participate in the game.

Upon determination to allow message transmission (step S501; YES), the message receiving unit 406 waits to receive message data from each of the communication apparatuses 10 (FIG. 6, step S601). Upon determination to disallow message transmission (step S501; NO), the notice sending unit 402 sends a disallowance notice to the communication apparatus 10 that has been determined to be disallowed (step S502). When a plurality of the communication apparatuses 10 have been determined to be disallowed, a disallowance notice is sent to all the disallowed communication apparatuses 10.

The notice receiving unit 403 of the disallowed communication apparatuses 10 receives a disallowance notice from the communication server 20 (step S503).

The message accepting unit 404 determines whether a predetermined time period has elapsed since last receipt of a disallowance notice from the communication server 20 (step S504). In other words, the message accepting unit 404 determines whether the current time and date is in the disallowed time period.

Here, the determining unit 401 of the communication server 20 determines whether to allow or disallow based on the progress of the network game. A disallowance notice is eventually sent to one communication apparatus 10 a plurality of times. For example, before the end of the disallowed time period specified in the first disallowance notice, the second disallowance notice is possibly sent. In such a case, the message accepting unit 404 determines whether the disallowed time period specified by the most current disallowance notice of all the received disallowance notices has ended.

When the predetermined time period has not elapsed (step S504; NO), the message accepting unit 404 does not accept an input of message data until lapse of the predetermined time period (step S505). For example, in a configuration of voice chat, where an input of sound message data is accepted, the message accepting unit 404 turns off a microphone that incorporates sound and deletes the incorporated sound data. For example, in a configuration for accepting an input of video message data, the message accepting unit 404 turns off a camera that shoots an image and deletes the shot image data. For example, in a configuration for accepting an input of message data of text, etc., the message accepting unit 404 deactivates key input of text or the like, turns off a message input form, and delete data input to the input form.

After lapse of the predetermined time period (step S504; YES), the message accepting unit 404 accepts an input of message data from a user (FIG. 6, step S602). For example, in a configuration for accepting an input of sound message data, the message accepting unit 404 turns on a microphone that incorporates sound, converts the acquired sound into digital sound data using an A/D converter, and creates sound message data. For example, in a configuration for accepting an input of video message data, the message accepting unit 404 turns on a camera that shoots an image, converts the acquired image into digital image data, and creates video message data. For example, in a configuration for accepting an input of message data of text, etc., the message accepting unit 404 activates key input of text or the like, turns on a message input form, and creates message data of text, etc.

Then the message sending unit 405 sends the created message data to the communication server 20 (step S603).

The message receiving unit 406 of the communication server 20 receives message data from the communication apparatus 10 (step S604) and stores the received message data in the storage unit 203 (step S605). The message receiving unit 406 stores the received message data, the received time and date, and information on the sender of the message data such that they are associated with each other. When the destination of the message data is specified, information on the destination is stored.

In this way, the storage unit 203 of the communication server 20 stores message data sent from each of the communication apparatuses 10. When a disallowance notice has not been sent to any of the communication apparatuses 10 or the current time and date is not in any of the disallowed time periods specified by disallowance notices sent to the communication apparatuses 10, all the communication apparatuses 10 are allowed to send message data. Accordingly, message data sent from an arbitrary one of the communication apparatuses 10 is stored in the storage unit 203. When the current time and date is in the disallowed time period specified by a disallowance notice sent to any one of the communication apparatuses 10, message data sent only from the allowed communication apparatus 10 is stored in the storage unit 203.

(Distribution of Message Data)

Figure 7:
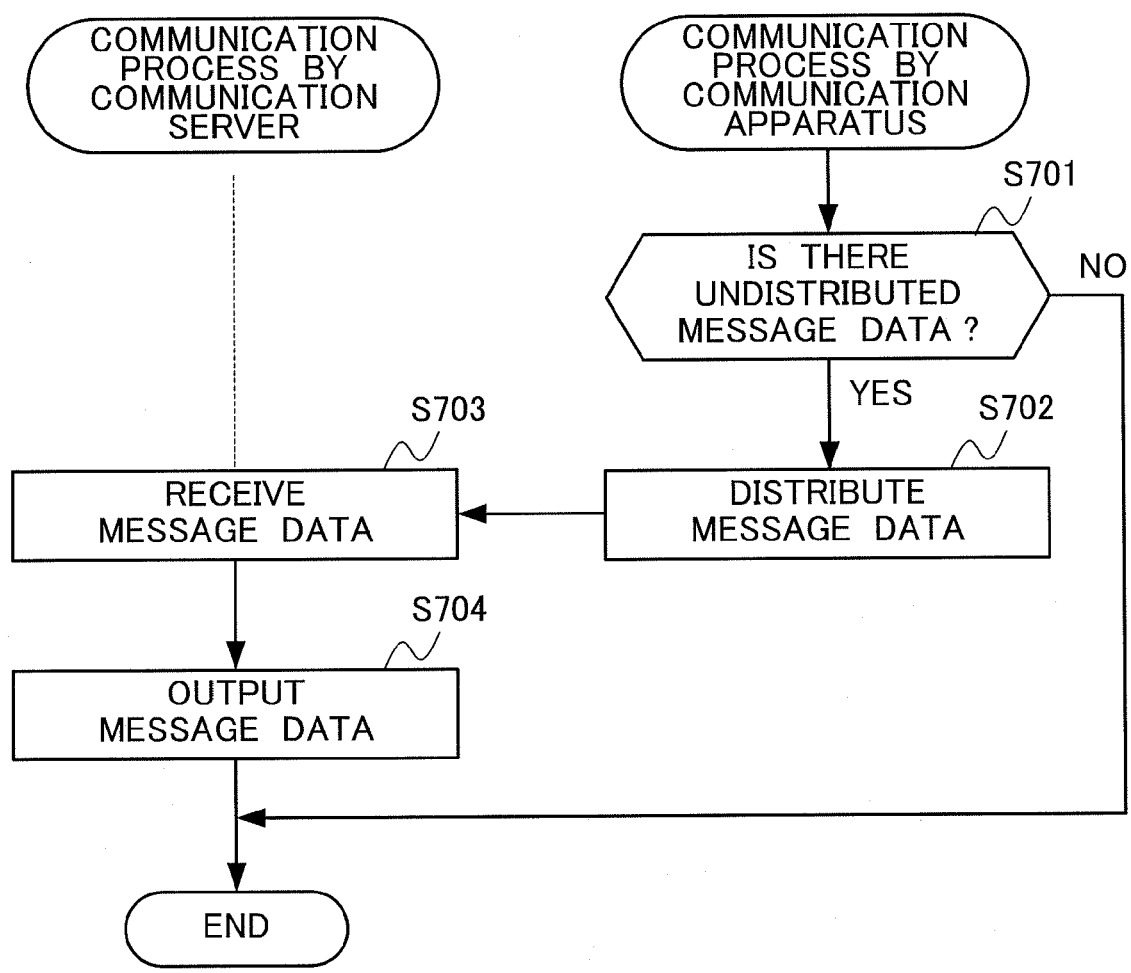
FIG. 7 is another flowchart for explaining the communication process of the communication apparatus and the communication server.

Next, the process of distributing message data by the communication server 20 to the communication apparatus 10 is explained in reference to the flowchart in FIG. 7. If any message data stored in the storage unit 203 has not been distributed, the control unit 201 of the communication server 20 distributes message data according to the following procedure:

The control unit 201 of the communication server 20 determines whether there any message data in the storage unit 203 that has not been distributed (step S701). For example, the control unit 201, at the time of storing message data in step S605, sets the distribution flag, which shows whether or not the message data has been distributed, to "0 (not distributed)" and save the setting in association with the message data. As discussed below, after the message data has been distributed, the distribution flag is updated to "1 (distributed)". In this way, whether or not message data has been distributed can be determined by referring to the distribution flag. Alternatively, the control unit 201 may store only undistributed message data in the storage unit 203 and upon completion of distribution delete the distributed message data from the storage unit 203. In this case, the distribution flag may be omitted.

When there is no undistributed message data (step S701; NO), the control unit 201 ends the communication process. In this case, message data is not distributed to the communication apparatuses 10.

When undistributed message data exists (step S701; YES), the control unit 201 reads out the undistributed message data from the storage unit 203. Then, the control unit 201 sends the read out message data to each of the communication apparatuses 10 (or a specified one(s) of the communication apparatuses 10) (step S702).

The output unit 408 of each of the communication apparatuses 10 receives message data sent from the communication server 20 (step S703) and outputs a message presented by the message data to the monitor, the speaker, or the like (step S704). When the message data is sound data, the output unit 408 decodes the sound data, which is the message data, and outputs the sound to the speaker. When the message data is image or text data or the like, the output unit 408 displays the image or the text on the monitor.

According to this embodiment, when a disallowance notice has not been sent to any of the communication apparatuses 10 or when the current time and date is not in the disallowed time period specified in any of the disallowance notices sent to the communication apparatuses 10, message data sent from an arbitrary one of the communication apparatuses 10 is distributed to each of the communication apparatuses 10. When the current time and date is in the disallowed time period specified by a disallowance notice sent to any one of the communication apparatuses 10, message data sent only from the allowed communication apparatus 10 is distributed to each of the communication apparatuses 10.

For example, in a Mah-jong game, when a player P1 discards a winning tile of a player P2 and the player P2 wins, it may be determined that only the communication apparatus 10 operated by the winning player P1 is allowed to send message data and that message data transmission from the other players is disallowed. Before the game ends (no player has won the game), all the players are allowed send a message at an optional timing. When the player P1 discards a winning tile of the player P2 and the player P2 wins, the determining unit 401 allows only the communication apparatus 10 operated by the player P1 to send message data and disallows the communication apparatuses 10 operated by P2, P3, . . . , PN (including the observing players) to do the same. More specifically, when the player P1 wins, only the player P1 is allowed to make comments for a predetermined time period, and the other players are disallowed. The winning player can express his/her afterthoughts, make explanatory comments, and claim victory until the predetermined time period elapses. The winning player can feel a sense of triumph, thereby increasing the level of interest in the game.

For example, in a Mah-jong game, when a player P1 discards a winning tile of a player P2 and the player P2 wins, it may be determined that only the communication apparatus 10 operated by the losing player P2 is allowed to send message data and that message data transmission from the other players is disallowed. Before the game ends, all the players can send a message at an optional timing. However, when the player P1 discards a winning tile of the player P2 and the player P2 wins, the determining unit 401 allows only the communication apparatus 10 operated by the losing player P2 to send message data and disallows the communication apparatuses 10 operated by players P1, P3, . . . , PN (including the observing players) to do the same. More specifically, when the player P1 wins, only the losing player P2 must make comments, and the other players cannot. The losing player has to express his/her afterthoughts, make excuses, conduct a loser's interview, and claim defeat until a predetermined time period elapses. The other players feel triumphant, thereby increasing the level of interest in the game. As the losing player has to make comments, the level of tension and the level of realism increase.

According to this embodiment, the notice sending unit 402 sends a disallowance notice only to the communication apparatuses 10 that are disallowed to send message data. However, the notice sending unit 402 may be configured to include, in a disallowance notice, ID information for identifying the communication apparatuses 10 disallowed (or allowed) to send message data and send the disallowance notice to all the communication apparatuses 10. For example, information included in the disallowance notice indicates "the communication apparatuses 10 other than the communication apparatus 10 of a terminal Q1 are disallowed to send message data for a predetermined time period" or "only the communication apparatus 10 of a terminal Q1 is allowed to send message data for a predetermined time period". This kind of disallowance notice is sent to all the communication apparatuses 10. Then the message accepting unit 404 compares the ID information of the disallowed communication apparatus 10, which is indicated by the disallowance notice received by the notice receiving unit 403, with its own ID information (ID information of the communication apparatus 10 in receipt of the disallowance notice). If the comparison shows agreement therebetween, the process subsequent to step S504 is executed. If not, the process goes back to step S602, and an input of message data is accepted. In this way, the process of sending a disallowance notice by the communication server 20 can be simplified. Since all the communication apparatuses 10 can recognize which of the communication apparatuses 10 is disallowed, a variety of game settings can be made for a disallowed time period. For example, before the disallowed time period begins, the CPU 101 of the disallowed communication apparatus 10 may display "Please see a press conference of the player of the terminal Q1. It is just about to begin." on the monitor to inform all the players of the press conference.

According to this embodiment, the distributing unit 407 sends message data stored in the storage unit 203 to each of the communication apparatuses 10. However, the distributing unit 407 does not have to wait for completion of the whole process of receiving message data in order to start distribution. More specifically, as streaming replay, message data receipt may be performed concurrently with distribution. For example, sound message data distribution consumes an extraneously long time if it is performed after completing the steps of accepting an input of message data by the communication apparatus 10 until lapse of a predetermined time period, sending the message data by the communication apparatus 10 upon lapse of the predetermined time period, and receiving all the message data by the communication server 20. When the volume of message data is large and it takes a long time before distribution of all the message data is completed, it is desired that the message sending unit 405 continues to send, on a piece-by-piece basis, message data for the predetermined time period to the communication server 20 as in the manner of streaming replay and one-way phone call. It is also desired that the message receiving unit 406 integrates the received pieces of the message data in sequence for storage thereof and that the distributing unit 407 in sequence sends the stored message data.

As described above, according to this embodiment, the winning player who is allowed to send message data can exclusively send a message for a predetermined time period. Accordingly, each player is driven to achieving a higher score and better results and motivated to play the game. The losing player who is allowed to send message data sends (is forced to send) a message exclusively for a predetermined time period. Accordingly, each player is driven to achieving a high score and better results, and the level of tension increases in the game. In addition to the winning and losing players, the players who neither won nor lost the game and the observing players can always clearly see "who won (lost) the game", e.g., without having to perform a special operation such as displaying the results screen. During a predetermined time period in which the allowed player can exclusively send a message, the other players are disallowed to interrupt and make comments, thereby ensuring conveyance of a message from the allowed player to the other players. The communication system 1 can appropriately inform the players of the results and messages of another player during the progress of the game.

Embodiment 2

Next, another embodiment of the present invention is explained. In this embodiment, the communication server 20 changes the duration of a disallowed time period, in which message data transmission is disallowed, according to the progress and complexion of a network game. Configurations of this embodiment different from those of the above embodiment are described in detail. Configurations of this embodiment similar to those of the above embodiment are not explained.

Upon determination that message data transmission is disallowed in step S501 (step S501; NO), the determining unit 401 determines the disallowed time period based on the game progress and the like. The notice sending unit 402 sends a disallowance notice containing information on the determined disallowed time period to the communication apparatuses 10 that are disallowed to send message data.

Figures 8A, 8B:
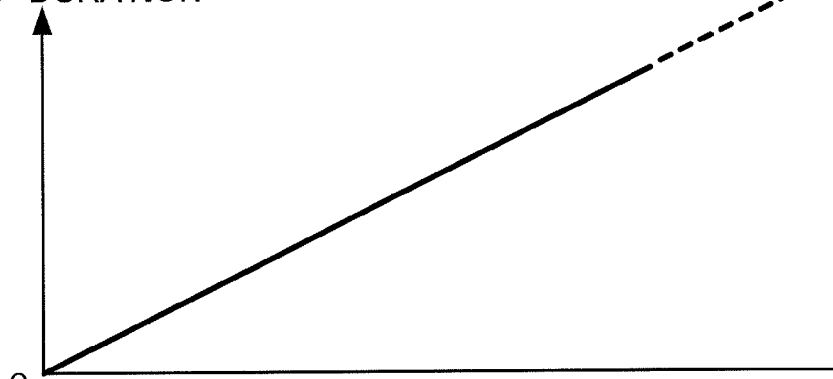
FIG. 8A is a diagram presenting an example relationship between conditions to be satisfied and the duration of the disallowed time period according to embodiment 2.
FIG. 8B is a diagram presenting an example relationship between the elapsed time of the game and the duration of the disallowed time period.

For example, when the player P1 discards a winning tile of the player P2 and the player P2 wins in the foregoing Mah-jong game, the determining unit 401 changes the duration of the disallowed time period based on the multiplier, the base point, the point, and whether the player is a dealer or a non-dealer. FIG. 8A is a diagram presenting an example relationship between the duration of the disallowed time period and conditions that need to be satisfied. For example, when the dealer player wins the game with the result of 3 multipliers and 40 base points, the duration of the disallowed time period is given by T2×C2+T5. The determining unit 401 sends the communication apparatuses 10 a disallowance notice including information on the determined disallowed time period. During the calculated disallowed time period, only the winning player P1 can make comments, e.g. comments for claiming victory. The other players cannot make comments and only have to listen to the winner's comments during the disallowed time period.

A disallowed time period can be determined not only for a Mah-jong game, but also for another arbitrary game in which players compete for better scores and the like. The determination of the disallowed time period can be made based on numerical parameters, such as scores gained and lost, rate of scores gained and lost, wins and losses, rate of wins and losses, the number of items in possession, game duration, and the like. For example, the disallowed time period may be determined, e.g., as "last one month", based on the results during a predetermined period (such as total scores gained and lost, rate of total scores gained and lost, all-time wins and losses, rate of all-time wins and losses, rank, the number of games played, etc.). Also, the disallowed time period can be determined based not only on numerical values, but also on a predetermined timing, situation, scene, event, or the like of a network game. The numerical parameters are stored in the storage unit 203 in association with at least one of the predetermined timing, situation, scene, and event during the game.

For example, in the foregoing group rope jumping game, there may be a situation where the player P1 is stuck with a rope to end or suspend the game. In such a situation, the disallowed time period should be made longer as the elapsed time between the beginning of the game and the end (or occurrence of suspension) thereof increases. The disallowed time period should be shortened as the elapsed time decreases. The disallowed time period is T1 when the duration of the rope jumping game is Ta, and the disallowed time period is T2 (T1<T2) when the duration is Tb (Ta<Tb). FIG. 8B is a diagram presenting an example relationship between the elapsed time of the rope jumping game and the duration of the disallowed time period. This figure illustrates that the relationship therebetween is proportional, but this relationship can be determined by an arbitrary function. The determining unit 401 sends the communication apparatuses 10 a disallowance notice including information on the determined disallowed time period. During the calculated disallowed time period, only the failing player P1 must make a comment, e.g., a comment of apology. The other players cannot comment during the disallowed time period.

The storage unit 203 in advance stores parameters that prescribe the relationships exemplified in FIG. 8A and FIG. 8B. The control unit 201 appropriately reads out the parameters that define these relationships from the storage unit 203 and calculates the duration of a disallowed time period.

The disallowed time period may be determined not only for the group rope jumping game, but also for another arbitrary game. The disallowed time period can be determined based on the duration between the beginning and end of the game, as well as on the duration of a situation, a scene, an event, or the like of the game. For example, in a tennis or table tennis game, the disallowed time period should be set long when a rally goes on for a long period of time, but it should be set short when a rally concludes quickly. For example, in a martial art fight game, the disallowed time period should be set long for an exciting fight in which it has taken long for one player to knock out the opponent. However, if the fight is short, the disallowed time period should be set short.

In this embodiment as well, ID information for identifying the communication apparatuses 10 disallowed (or allowed) to send message data may be included in a disallowance notice, and the disallowance notice be sent to all the communication apparatuses 10.

In this way, according to this embodiment, the winning player allowed to send message data can exclusively send a message, and the duration of message transmission increases as the score or the like increases. Accordingly, each player is driven to achieving a high score and better results, thereby raising the motivation for the game. The losing player allowed to send message data exclusively sends (has to send) a message, and the duration of message transmission increases as the score decreases. Accordingly, each player is driven to achieving a high score and better results, and the tension of the game increases. In addition to the winning and losing players, the players who neither won nor lost the game and the observing players can always see "who won (lost) by what margin", e.g., without having to perform a special operation such as displaying the results screen. The communication system 1 can appropriately inform each player of the results and messages of another player during the progress of the game.

Embodiment 3

Figure 9:
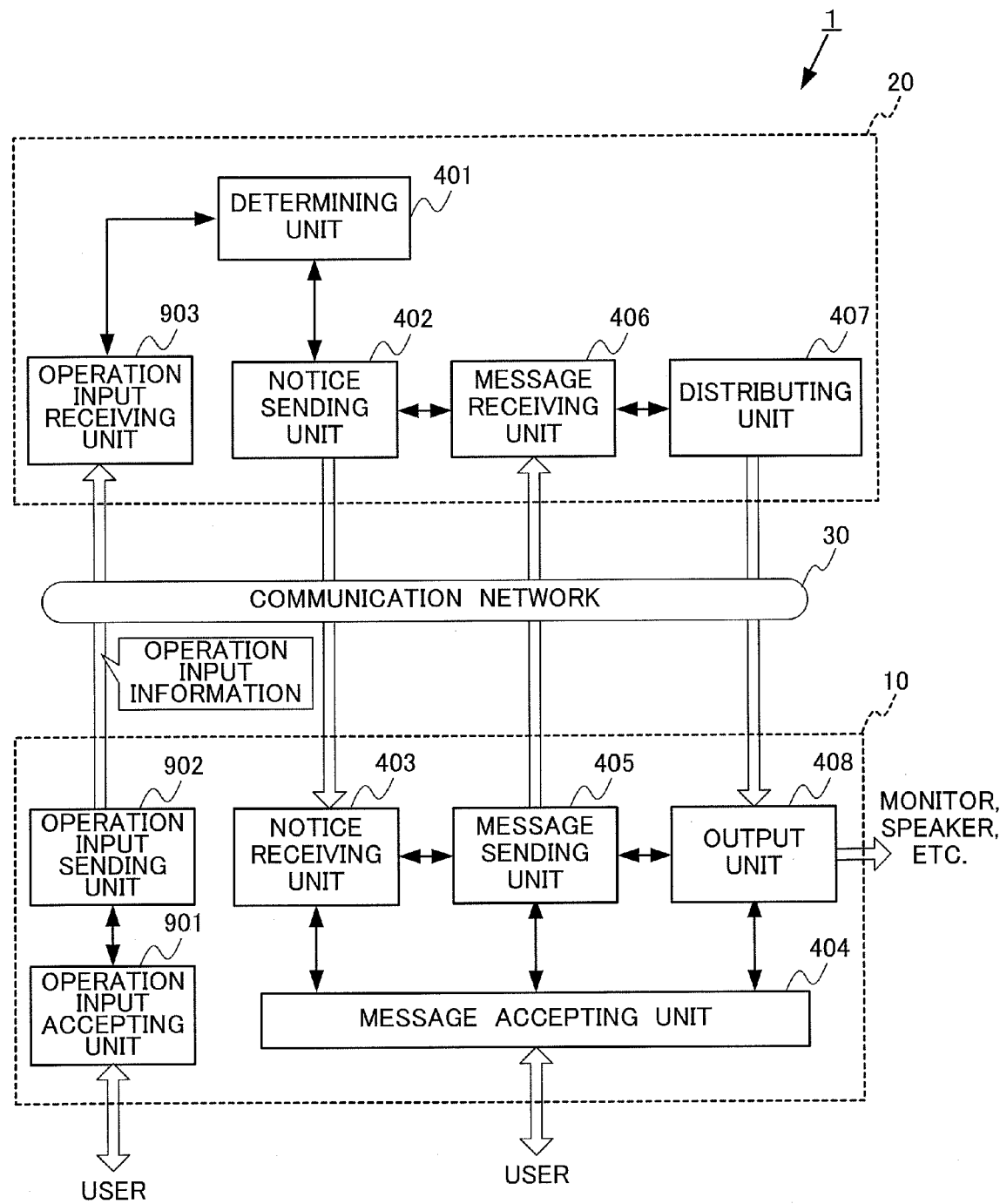
FIG. 9 is a diagram for explaining functional configurations of the communication apparatus and the communication server according to embodiment 3.

Next, still another embodiment of the present invention is explained. In this embodiment, the determining unit 401 of the communication server 20 allows or disallows message data transmission based whether a predetermined condition set for each of the communication apparatuses 10 is satisfied (whether the requirement is satisfied) in a network game. This is the difference between this embodiment and the foregoing embodiments, and only configurations of this embodiment that are different from those of the foregoing embodiments are described. Configurations similar thereto are not explained. The specifics are described in the text to follow:

FIG. 9 is a diagram illustrating configurations of the communication apparatus 10 and the communication server 20 according to this embodiment. As illustrated in the figure, the communication apparatus 10 further comprises an operation input accepting unit 901 and an operation input sending unit 902. The communication server 20 further comprises an operation input receiving unit 903.

The operation input accepting unit 901 accepts an input for game operation by a network game player (a user of the communication apparatus 10). For example, in the foregoing group rope jumping game, the controller 105 accepts, from the player, an operation input for specifying the timing and height of a jump and input the same to the CPU 101. The CPU 101 stores, in the RAM 103, information on the contents of the operation input (hereinafter referred to as "operation input information"). The CPU 101, the RAM 103, and the controller 105 cooperate to act as the operation input accepting unit 901.

The operation input sending unit 902 sends the communication server 20 the operation input information that has been accepted by the operation input accepting unit 901. The CPU 101, the RAM 103, and the NIC 110 cooperate to act as the operation input sending unit 902.

The operation input receiving unit 903 receives operation input information from each of the communication apparatuses 10 and store the same in the storage unit 203. The control unit 201, the communication unit 202, and the storage unit 203 cooperate to act as the operation input receiving unit 903.

In the foregoing step S501, the determining unit 401 determines whether message data transmission by each of the communication apparatuses 10 is allowed or disallowed based on whether the preset requirement is satisfied. To determine whether the predetermined condition (requirement) set for each of the communication apparatuses 10 is satisfied, the determining unit 401 compares the predetermined condition with information on the operation input received by the operation input receiving unit 903. When the predetermined condition is not satisfied (the requirement is not satisfied) by any one of the communication apparatuses 10, message data transmission by the other communication apparatuses 10 which satisfied the requirement is determined to be disallowed. It is also determined that message data transmission by the communication apparatuses 10 which did not satisfy the requirement is allowed.

An example requirement in the foregoing group rope jumping game is "continuing to jump without being stuck with a rope". When the operation input receiving unit 903 receives, from the communication apparatus 10, an instruction input that causes the character manipulated by a player not to be stuck with a rope while jumping, the determining unit 401 determines that "the requirement is satisfied" by that communication apparatus 10. When the operation input receiving unit 903 receives, from the communication apparatus 10, an instruction input that causes the character manipulated by a player to be stuck with a rope while jumping or receives no inputs therefrom, the determining unit 401 determines that "the requirement is not satisfied" by that communication apparatus 10. In this case, the communication apparatuses 10 operated by the player who was stuck with a rope (did not satisfy the requirement) is allowed, and the other communication apparatuses 10 operated by the players who were not stuck with a rope (did satisfy the requirement) are disallowed. Simply speaking, only the player who is stuck with a rope ends up having to send a message. For example, a player who was stuck with a rope and caused a nuisance to the other players is given an opportunity to make an excuse, an apology, etc.

An example requirement in a Mah-jong game is "not winning due to a winning tile discarded by another player". When the operation input receiving unit 903 receives, from the communication apparatus 10, an instruction input that causes the playing P1 to discard a winning tile of the player P2, the determining unit 401 determines that "the requirement is satisfied" by the communication apparatuses 10 that are operated by the players other than the player P2, whose winning tile was discarded. It is also determined that "the requirement is not satisfied" by the communication apparatus 10 operated by the player P2, whose winning tile was discarded. In this case, the communication apparatus 10 operated by the player P2, whose winning tile was discarded (not satisfying the requirement), is allowed, and the other communication apparatuses 10 (satisfying the requirement) are disallowed. Simply speaking, only the player P2, whose winning tile was discarded, ends up having to send a message. For example, the losing player P2 is given an opportunity to make an excuse, an apology, and the like and claim defeat.

Another example requirement in a Mah-jong game may be "not winning" When the operation input receiving unit 903 receives, from the communication apparatus 10, an instruction input that causes the player P1 to win by drawing a winning tile oneself or due to discarding of a winning tile the player P2, the determining unit 401 determines that the communication apparatus 10 operated by the winning player P1 "did not satisfy the requirement". On the other hand, the determining unit 401 determines that the communication apparatuses 10 operated by the players other the player P1 "satisfied the requirement". In this case, the communication apparatus 10 operated by the winning player P1 (who did not satisfy the requirement) is allowed, and the other communication apparatuses 10 (which satisfied the requirement) are disallowed. Simply speaking, only the winning player P1 ends up having to send a message. For example, the winning player P1 is given an opportunity to boast, make explanatory comments, and claim victory.

In this way, according to this embodiment, the player who "did not satisfy the requirement" and is allowed to send message data sends (has to send) a message to the other players. To avoid having to send a message, each player tries hard to satisfy the requirement, so the level of tension increases in the game. In addition to the players who satisfied and did not satisfy the requirement, the players who was neither successful nor unsuccessful and the observing players can always see "who satisfied (did not satisfy) the requirement" e.g., without having to perform a special operation such as displaying the results screen. The communication system 1 can appropriately inform the players of the results and messages of another player during the progress of the game.

Embodiment 4

Figure 10:
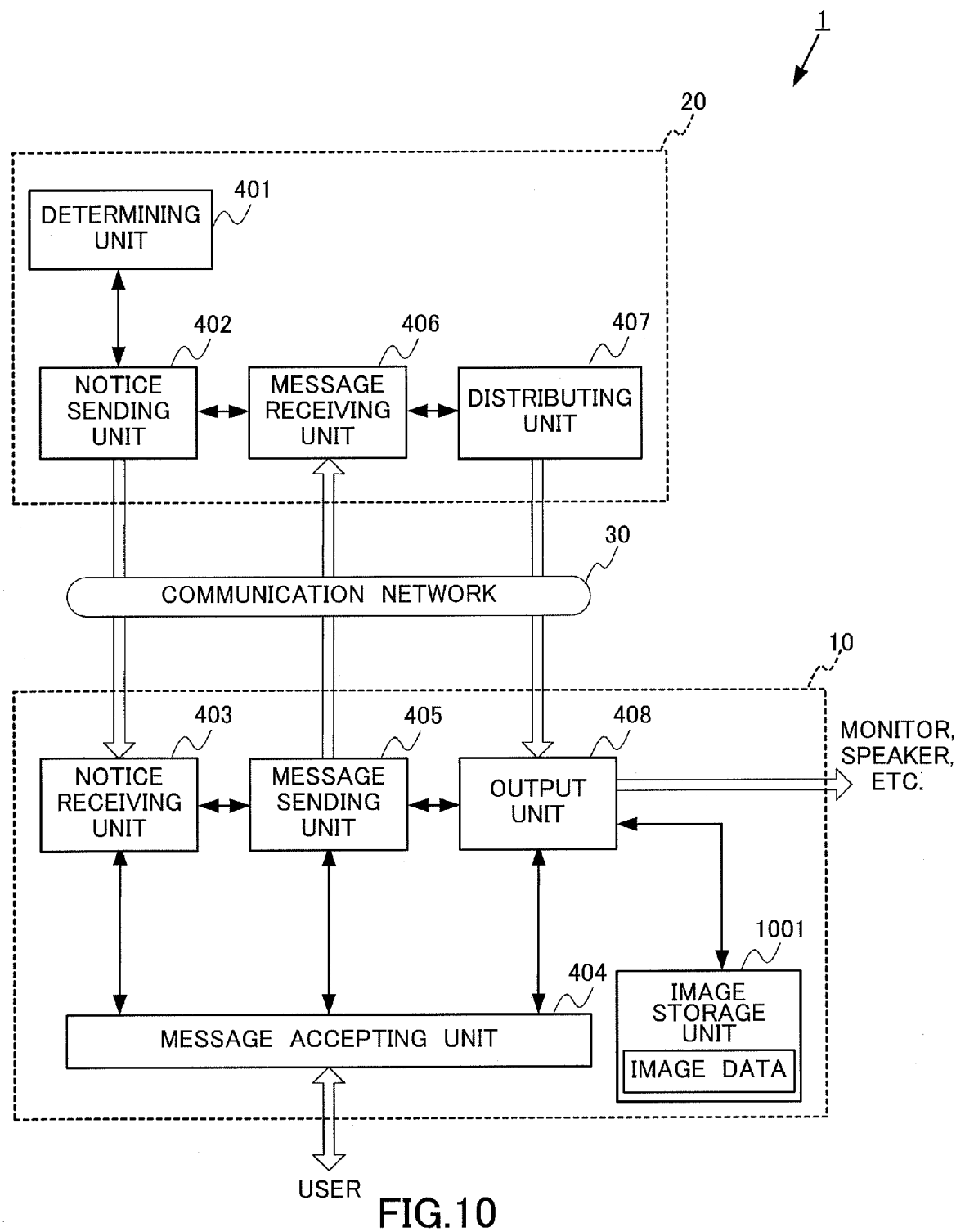
FIG. 10 is a diagram for explaining functional configurations of the communication apparatus and the communication server according to embodiment 4.

Next, yet still another embodiment of the present invention is explained. In this embodiment, the communication apparatus 10 changes the screen display based on whether message data transmission is allowed or disallowed. This embodiment may be combined with any of the foregoing embodiments, but here configurations according to this embodiment in combination with embodiment 1 are explained. Only configurations of this embodiment different from those of the foregoing embodiments are described in detail. Configurations similar thereto are not explained. The specifics are described in the text to follow:

FIG. 10 is a diagram illustrating configurations of the communication apparatus 10 and the communication server 20 according to this embodiment. The communication apparatus 10 further comprises an image storage unit 1001.

The image storage unit 1001 stores in advance ID information of each of the communication apparatuses 10 comprised in the communication system 1 and image data of predetermined character objects so that they are in association with each other. The predetermined character object is a character object called an avatar that is typically an alter ego of a player in a virtual space. The image data can be either a still image or a moving image. Its format is optional as long as it is a predetermined one whereby the CPU 101 can normally read out the image data for display thereof on the monitor. The external memory 106 acts as the image storage unit 1001.

The output unit 408 reads out image data from the image storage unit 1001 for display thereof on the monitor. Here, the output unit 408 changes the method of displaying image data based on whether message data transmission is allowed or disallowed.

When (a) the notice receiving unit 403 has not received a disallowance notice from the communication server 20 or (b) a predetermined time period has elapsed since last receipt of a disallowance notice, the output unit 408 displays, in a predetermined format, each image data of a predetermined character object stored in the image storage unit 1001. In the cases of (a) and (b) above, none of the communication apparatuses

10 is currently unavailable for message data transmission. For example, the output unit 408 displays the read-out image data as is at a predetermined position.

In a case other than (a) and (b) above—that is, when at least one of the communication apparatuses 10 cannot send message data—image data corresponding to ID information showing allowance of message data transmission is highlighted and displayed. Image data corresponding to ID information showing disallowance of message data transmission is displayed in a predetermined display format.

Figure 11A:
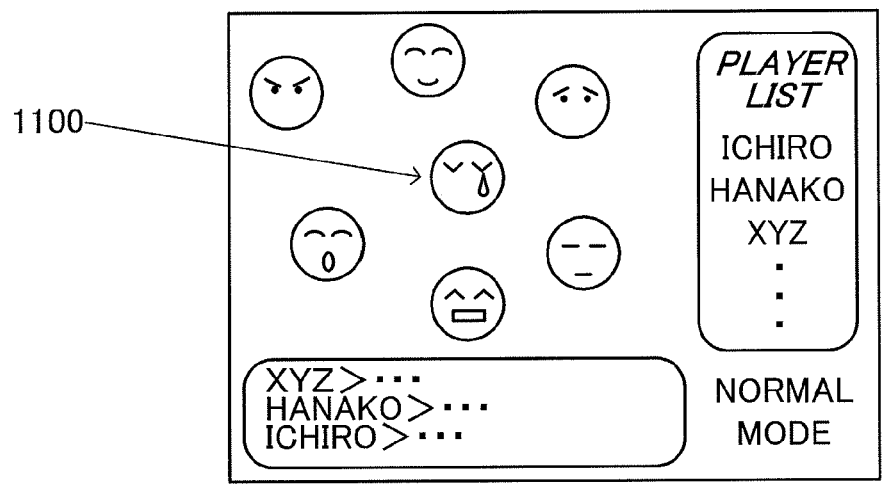
FIG. 11A is a diagram illustrating example displayed image data.
Figure 11B:
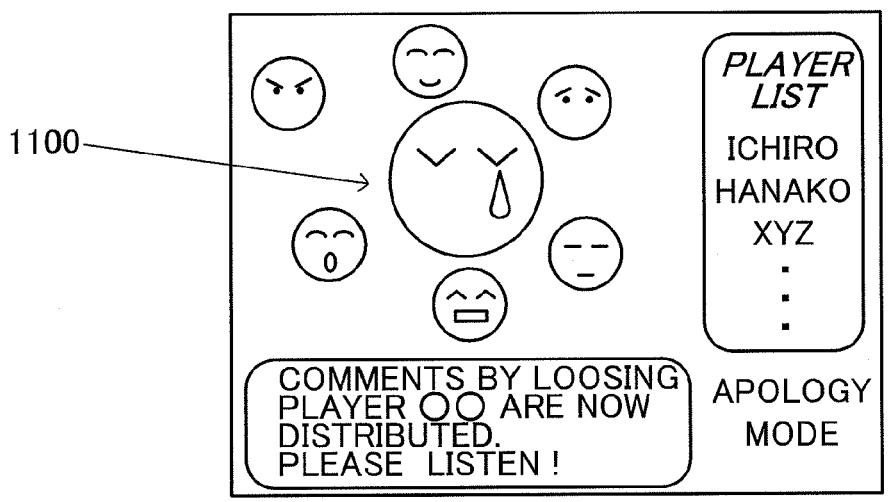
FIG. 11B is a diagram illustrating another example displayed image data.
Figure 11C:
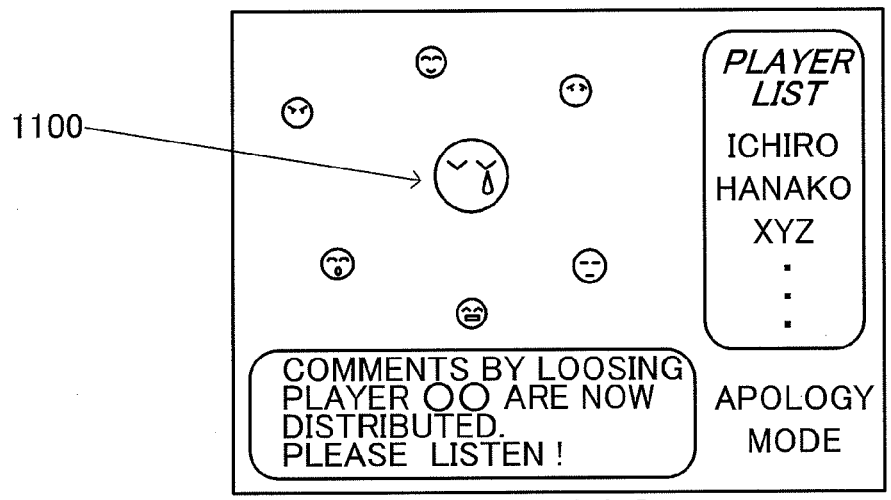
FIG. 11C is a diagram illustrating still another example displayed image data.

FIG. 11A to FIG. 11C are diagrams illustrating examples of screens displayed on the monitor by the output unit 408. FIG. 11A is a diagram illustrating example display of a normal mode where all the communication apparatuses 10 are allowed to send message data. FIG. 11B and FIG. 11C are diagrams illustrating example display of situations where only one of the communication apparatuses 10 is allowed to send message data. These diagrams illustrate an "apology mode", where only the communication apparatus 10 operated by the player who lost a network game is allowed to send message data.

Specifically, as illustrated in FIG. 11B, highlight display means increasing the height and width of only image data 1100, which corresponds to the ID information of the communication apparatus 10 allowed to send message data, and displaying the image data 1100 with the increased height and width. The other image data are not enlarged, but they are displayed as is at a predetermined size. Alternatively, as illustrated in FIG. 11C, the image data 1100, which corresponds to the ID information of the communication apparatus 10 allowed to send message data, is enlarged in height and width or displayed as is in an original size. When the image data 1100 is displayed as is, the other image data are contracted in height and width so that they are comparatively small.

Various other methods are available as well. For example, only the image data corresponding to the ID information of the communication apparatus 10 that is allowed to send message data may be zoomed up for display thereof, while the other image data are not displayed. The zooming rate is optional. However, enlargement is not always necessary. It is possible not to display all the image data corresponding to the ID information of the communication apparatuses 10 that are allowed to send message data. An image may be contracted instead of being enlarged, as long as the size thereof is comparatively different.

For example, only the image data corresponding to the ID information of the communication apparatus 10 that is allowed to send message data is intentionally displayed with a "mosaic", "blurring", "blinding", or like effect. As a result, it is difficult to see that image data, while the other image data are displayed as is in a predetermined format. This method is effective for displaying the character object of a losing player.

For example, the hue, tone, brightness, etc. of image data are changed. This change can be made by color displaying only the image data corresponding to the ID information of the communication apparatus 10 that is allowed to send message data, while the other image data are displayed in a black and white or monochromatic mode.

For example, only the image data corresponding to the ID information of the communication apparatus 10 that is allowed to send message data is surrounded by very noticeable brackets, such as bold and red ones, while the other image data are displayed as is in a predetermined format.

For example, only the image data corresponding to the ID information of the communication apparatus 10 that is allowed to send message data is blinked, while the other image data are displayed as is in a predetermined format.

For example, only the image data corresponding to the ID information of the communication apparatus 10 that is allowed to send message data is moved to make a visually noticeable motion of "raising a hand", while the other image data are displayed in a predetermined format (making a motion different from "raising a hand"). In this case, the image storage unit 1001 stores first image data to be displayed when message data transmission is allowed and second image data to be displayed when disallowed. The output unit 408 should select image data to be read out on the basis of allowance or disallowance. The motion is not limited to "raising hand" and optional.

The above methods are examples of highlight display, but other methods can be adopted therefor. Some or all of the foregoing methods may be combined.

According to this embodiment, the method of displaying image data is changed based on whether message data transmission is allowed or disallowed. "Who won (lost)" can be more clearly known all the time. For example, when message data is sent and received in the form of sound, the sound is played, and an image is displayed as well. The progress and outcome of the game can be known to each player in an audibly and visually understandable manner.

Also, the degree of highlighting may be changed depending on the progress, complexion, and outcome of the game. By changing the degree, "who won (lost) by what margin" can be more clearly known all the time.

For example, when the player P1 discards a winning tile of the player P2 and the player P2 wins in the foregoing Mahjong game, the output unit 408 changes the zooming rate according to the multiplier, the base point, the point, and the like. As these values increase, the zooming rate increases. Since the benefit (damage) increases as the change in the score increases, the zooming rate increases for display as the change in the score increases.

For example, in the foregoing group rope jumping game, when the player P1 is stuck with a rope to end or suspend the game, the output unit 408 determines the zooming rate of image data. The zooming rate is determined so that it is comparatively large when the time elapsed from the beginning of the game to the end (suspension) thereof is long and that it is comparatively small when the elapsed time is short. The responsibility for the failure increases as the elapsed time increases. By increasing the zooming rate as the elapsed time increases, the degree of responsibility can be displayed in a readily understandable manner.

Embodiment 5

Figure 12:
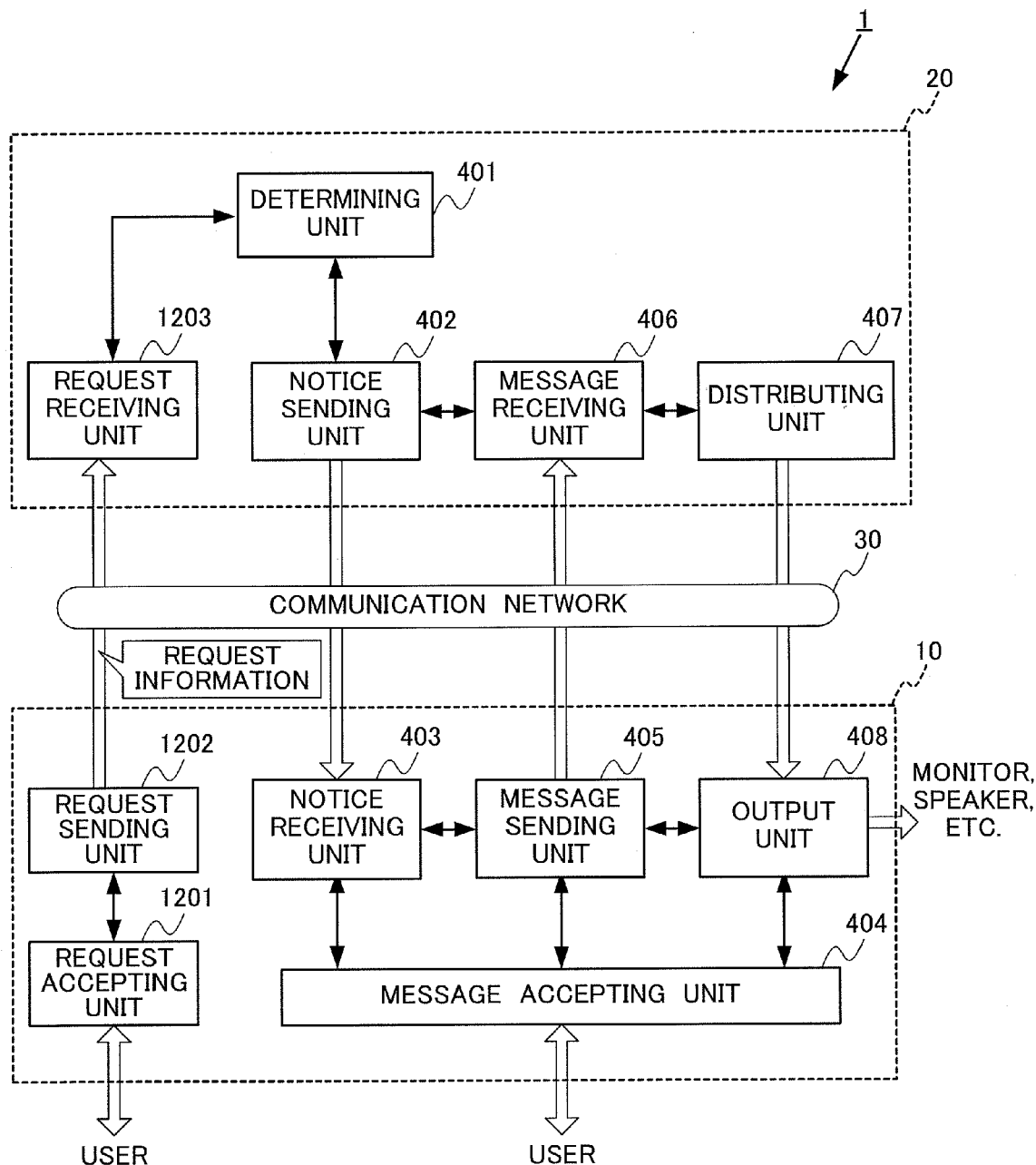
FIG. 12 is a diagram for explaining functional configurations of the communication apparatus and the communication server according to embodiment 5.

Next, yet further still another embodiment of the present invention is explained. This embodiment differs from the above embodiments in that the foregoing disallowed time period can be extended. The specifics are described in the text to follow:

FIG. 12 is a diagram illustrating configurations of the communication apparatus 10 and the communication server 20 according to this embodiment. As illustrated in this figure, the communication apparatus 10 further comprises the request accepting unit 1201 and the request sending unit 1202. The communication server 20 further comprises the request receiving unit 1203.

The request accepting unit 1201 accepts a request from a user to extend the foregoing predetermined time period (disallowed time period) during which message data transmission is restricted. The CPU 101 and the interface 104 cooperate to act as the request accepting unit 1201.

However, the request accepting unit 1201 of the communication apparatus 10 that is disallowed to send message data accepts this request for extension of the predetermined time period. In other words, the request accepting unit 1201 of the communication apparatus 10 that has sent message data during the disallowed time period does not accept this request. A player who has received message data and listened to (seen) the message during the disallowed time period can request an extension thereof.

The request sending unit 1202 sends the communication server 20 information on a request accepted by the request accepting unit 1201 (hereinafter referred to as "request information"). The CPU 101 and the NIC 110 cooperate to act as the request sending unit 1202.

The request receiving unit 1203 receives request information from each of the communication apparatuses 10. The control unit 201 and the communication unit 202 cooperate to act as the request receiving unit 1203.

The determining unit 401 determines whether or not to extend the time period in which message data transmission is restricted (disallowed time period). This determination is made based on the total number of pieces of request information received by the request receiving unit 1203 as well as the total number of the communication apparatuses 10 connected to the communication network 30 (the total number N of the communication apparatuses 10 comprised in the communication system 1).

More specifically, the determining unit 401 determines whether the total number of pieces of request information is greater than half the total number N of the communication apparatuses 10. In other words, it is determined whether the percentage of players who want an extension is greater than 50%. However, the determination does not have to be based on majority. It may be made based on whether the percentage is greater than an arbitrary predetermined value. It is desirable that each one of the communication apparatuses 10 is allowed to send request information to the communication server 20 only once. Also, it is desirable to limit the time period for making a request, so that only valid request information is information received by the request receiving unit 1203 during a predetermined time period, which begins at the time of starting to accept requests. Other request information is deemed to be invalid.

The duration of the extension may be as long as the time period specified in the first disallowance notice. It may also be a predetermined time period set in advance based on the number of times a request is received—e.g., the time period is T1 for the first time, T2 for the second time, . . . , Ti for the ith time (i is an integer greater than or equal to 1).

The determining unit 401 may extend the time period as the number of request information pieces increases. In addition, the determining unit 401 may extend the time period as the ratio of the total number of request information pieces to the number of communication apparatuses 10 increases.

Upon determination of extension by the determining unit 401, the notice sending unit 402 again sends the communication apparatuses 10, to which the last disallowance notice was sent, a disallowance notice that indicates disallowance of message data transmission.

Here, when varying the disallowed time period according to the total number and ratio, instead of setting the disallowed time period to a predetermined value, the notice sending unit 402 should send a disallowance notice containing information on the duration of the extension of the disallowed time period.

Figure 13:
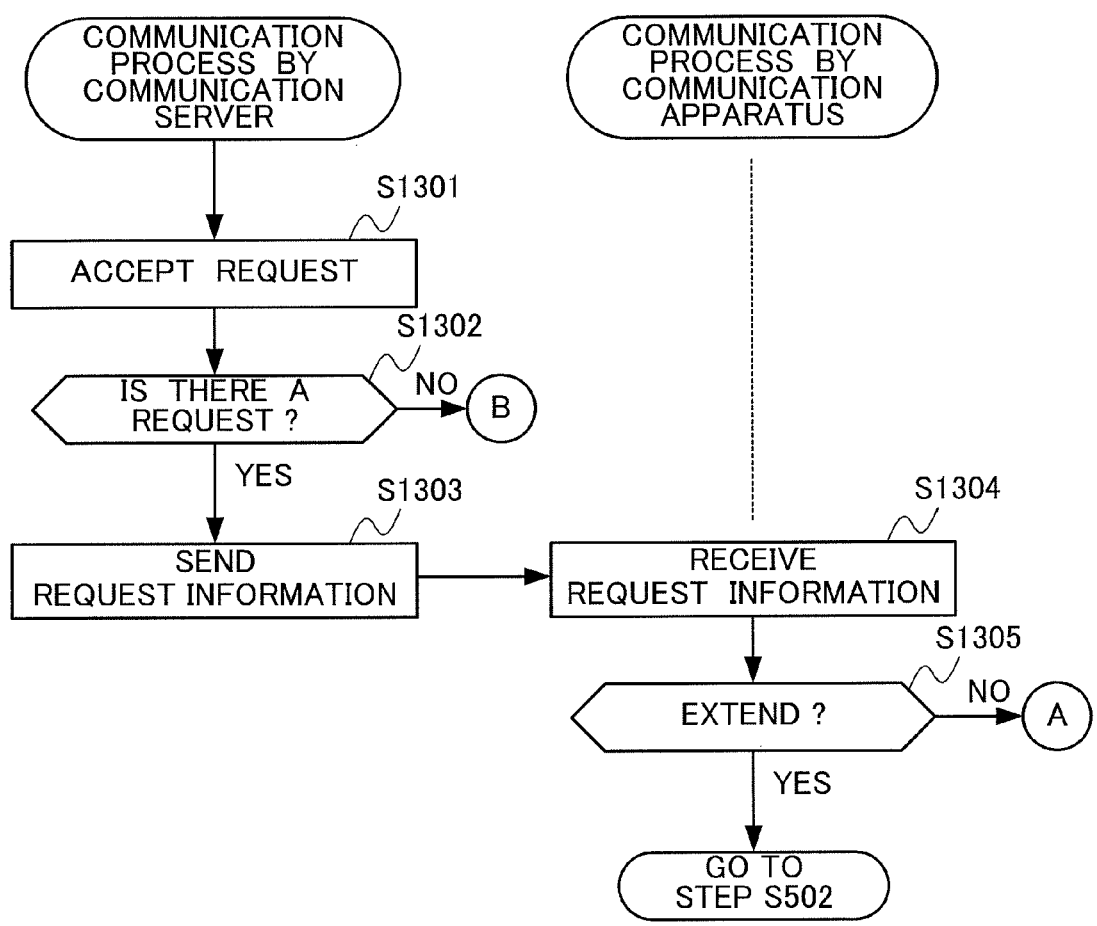
FIG. 13 is a flowchart for explaining a communication process of the communication apparatus and the communication server according to embodiment 5.

Next, a communication process of the communication apparatus 10 and the communication server 20 according to this embodiment is explained using the flowchart in FIG. 13. This flowchart is a continuation of the flowchart explained for embodiment 1 described above.

First of all, the request accepting unit 1201 accepts inputs of requests for extending the disallowed time period from players of a network game (users of the communication apparatuses 10) (step S1301). For example, in step S704, after outputting message data from the communication apparatus 10 that is allowed to send message data during the disallowed time period, the request accepting unit 1201 accepts requests for extension from the other communication apparatuses 10 that are disallowed.

The request sending unit 1202 determines whether there is a request for extension of the disallowed time period (step S1302). Upon determination that there is no request (step S1302; NO), as in the case of the above embodiments, the message accepting unit 404 accepts an input of message data (step S603). The subsequent process is the same as above. Upon determination that there is a request (step S1302; YES), the request sending unit 1202 sends the communication server 20 request information indicating a request for extension of the disallowed time period (step S1303).

The request receiving unit 1203 receives the request information from the communication apparatus 10 (step S1304) and input the same to the determining unit 401.

The determining unit 401 determines whether or not to extend the disallowed time period (step S1305). The request receiving unit 1203 can receive request information uniformly from all the (N) communication apparatuses 10 comprised in the communication system 1. The request receiving unit 1203 eventually receives more than one piece of request information at one time. For example, the determining unit 401 determines whether the total number of request information pieces has reached a majority (50%) of the total number N of the communication apparatuses 10. If it reaches a majority (50%), extension is determined. If not (below 50%), extension is not determined. Alternatively, determination may be made based on which item receives the largest number of votes.

Upon determination not to extend the disallowed time period (step S1305; NO), the process goes back to step S601, and receipt of message data is awaited. The subsequent process is the same as above. Upon determination to extend the disallowed time period (step S1305; YES), the process proceeds to step S502, and the notice sending unit 402 sends a disallowance notice again.

In this way, according to this embodiment, players can request a message to be resent. When several players request likewise, a message can be resent based on, e.g., which item receives the largest number of votes.

For example, it is assumed that in the foregoing group rope jumping game, only the player P1, who was stuck with a rope and caused a nuisance to the other players is given an opportunity to send a message to make an excuse, apology, and the like, sends a message. If a majority of the players P2, P3, . . . , PN who have heard seen (heard) the message feels that the player P1 is "not sincere", "not sorry", or the like do not accept the comment and request a further comment, the communication server 20 again allows only the player P1 to send a message. Then the player P1 sends a message again. This process is repeated until the communication server 20 determines not to extend the period. Not only does the communication system 1 have a network game feature, but also it serves as a communication tool of the game.

For example, in the foregoing Mah-jong game, it is assumed that only the winning player is allowed to send a message for a predetermined time period and in response thereto sends a message containing explanatory comments on the game. If the predetermined time period elapses and the message ends halfway while the winning player is speaking (writing), other players can request an extension of time. When many of the other players request, retransmission of a message can be allowed, and the winning player can continue speaking (writing) to make further explanatory comments. The other players can listen to (see) the continuation.

Embodiment 6

Next, yet further still another embodiment of the present invention is explained. According to the above embodiments, the communication server 20 sends a "disallowance notice" to communication apparatuses 10 that are "disallowed" to send a message, instead of sending an "allowance notice" to a communication apparatus 10 that is "allowed" to send a message. The reason is that many of the specifications of widely spread messaging, chatting, bulletin board, and like systems allow users to freely make comments and write messages without receiving an express allowance notice as long as user authentication is properly given. The specifications according to the above embodiments allow any player to freely make comments and write messages unless a disallowance notice is received or except during the disallowed time period. As explained below, it is a matter of course that a configuration for sending an "allowance notice" instead of a "disallowance notice" is possible.

Figure 14:
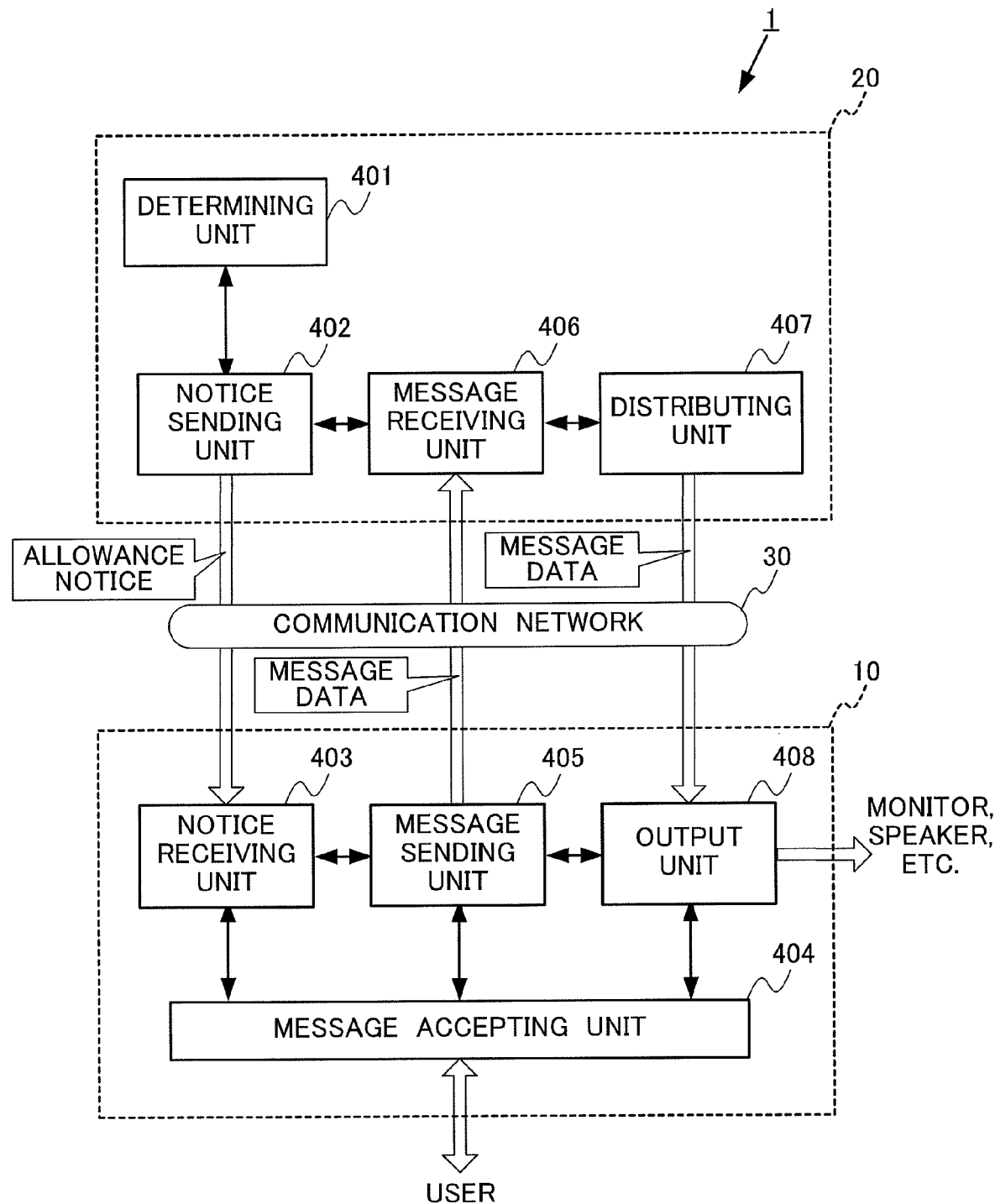
FIG. 14 is a diagram for explaining functional configurations of the communication apparatus and the communication server according to embodiment 6.

FIG. 14 is a diagram illustrating configurations of the communication apparatus 10 and the communication server 20 according to this embodiment. The difference from embodiment 1 is that the notice sending unit 402 sends an "allowance notice" instead of a "disallowance notice". Only configurations according to this embodiment different from those according to the above embodiments are described in detail, but similar ones are not explained. The specifics are described in the text to follow:

Of the communication apparatuses 10 comprised in the communication system 1, the notice sending unit 402 sends an allowance notice, the notice indicating allowance of message data transmission, to the communication apparatus 10 that is determined by the determining unit 401 to be allowed to send message data. More specifically, the control unit 201 controls the communication unit 202 to send a packet containing an allowance notice to the communication apparatus 10 that has been determined to be allowed to send message data by the control unit 201.

An allowance notice contains information on a predetermined time period (allowed time period) during which message data transmission is allowed. For example, an allowed period is specified as, e.g., "X seconds after receiving (or sending) an allowance notice", "from a time T1 to a time T2", or the like. Also, it may be either a fixed or variable value. The notice sending unit 402 may set different allowable time periods for different timings, situations, scenes, events, and the like of a network game. As well, an unspecified time period, such as "a time period until a predetermined event next occurs", may be specified as an allowed time period. When the allowed time period is constantly set to a fixed value, information on the allowed time period does not need to be contained in an allowance notice.

Upon determination by the determining unit 401 that message data transmission is allowed after expiry of the allowed time period, the notice sending unit 402 sends an allowance notice again prior to the expiry thereof. It is as if renewing a license. Upon determination by the determining unit 401 that message data transmission is disallowed after expiry of the allowed time period, the notice sending unit 402 does not send an allowance notice. After the expiry, the message sending unit 405 of a disallowed communication apparatus 10 cannot send message data.

The notice receiving unit 403 receives an allowance notice from the communication server 20 and inputs the received allowance notice to the message accepting unit 404.

When the notice receiving unit 403 is in receipt of an allowance notice showing that the current time and date is in the allowed time period, the message accepting unit 404 accepts an input of message data from players (users). Even if the communication apparatus 10 is in receipt of an allowance notice, the player thereof cannot send a message after lapse of a predetermined time period.

(Message Data Transmission)

Figure 15:
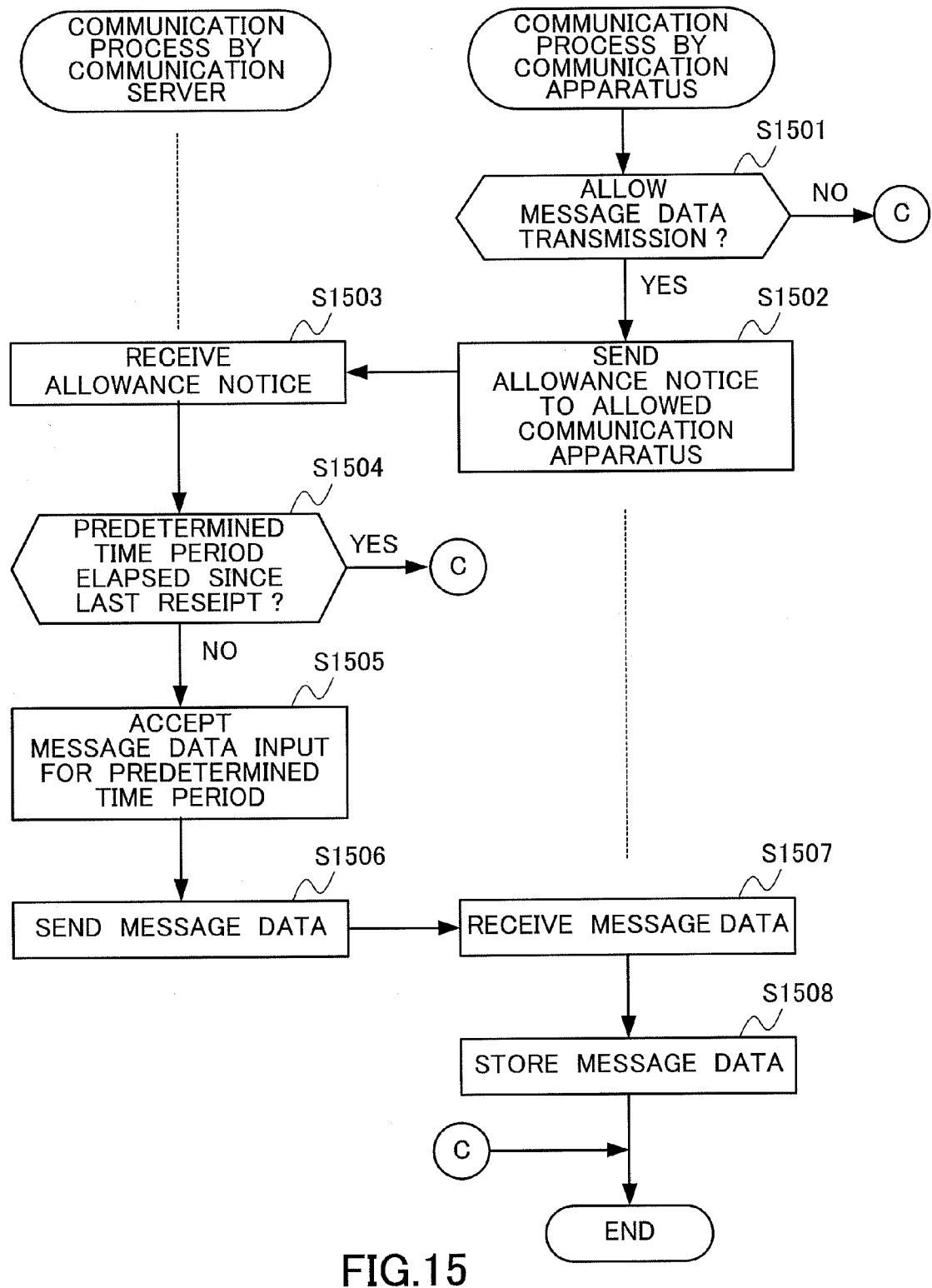
FIG. 15 is a flowchart for explaining a communication process of the communication apparatus and the communication server according to embodiment 6.

Next, the process of each of sending message data to the communication server 20 by the communication apparatuses 10 is explained using the flowchart of FIG. 15.

First of all, the determining unit 401 determines whether to allow or disallow each of the communication apparatuses 10 to send message data (step S1501).

For example, in the foregoing group rope jumping game, all the communication apparatuses 10 are determined to be allowed to send message data for a predetermined time period during or before the beginning of rope jumping. While rope jumping is continuing due to occurrence of no mistake and message data transmission continues to be allowed, the determining unit 401 determines that all the communication apparatuses 10 are allowed to send message data for another predetermined time period.

When any of the character objects manipulated by players is stuck with a rope and fails to jump the rope, the communication apparatus 10 operated by the failing player is determined to be allowed to send message data. The other communication apparatuses 10 are determined to be disallowed.

Upon determination to disallow message data transmission (step S1501; NO), the communication server 20 ends the communication process. In this case, message data is not sent to the communication server 20. Upon determination to allow message data transmission (step S1501; YES), the notice sending unit 402 sends an allowance notice to the communication apparatus allowed to send message data (step S1502).

According to this embodiment, ID information for identifying the communication apparatus 10 allowed to send message data (or the communication apparatuses 10 disallowed to send message data) may be configured to be contained in an allowance notice, so that the allowance notice is sent to all the communication apparatuses 10. For example, the allowance notice, which contains information indicating "message data transmission from the communication apparatus 10 of a terminal Q1 is allowed for a predetermined time period", is sent to all the communication apparatuses 10. The message accepting unit 404 compares the ID information of the communication apparatus 10 allowed to send message data, which is indicated in the allowance notice received by the notice receiving unit 403, with its own ID information (the ID information of the communication apparatus 10 in receipt thereof). If they are in agreement, the process subsequent to step S1502 is performed. If not, the communication process ends. In this way, the process of sending an allowance notice by the communication server 20 can be simplified. Since which communication apparatus 10 is allowed (disallowed) to send message data can be recognized by all the communication apparatuses 10, various game settings can be constructed.

The notice receiving unit 403 receives an allowance notice from the communication server 20 (step S1503).

The message accepting unit 404 determines whether a predetermined time period has elapsed since last receipt of an allowance notice (step S1504). In other words, the message accepting unit 404 determines whether the current time and date is in the allowed time period.

When the predetermined time period has elapsed (step S1504; YES), the message accepting unit 404 does not accept an input of message data and ends the communication process. In this case, message data is not sent to the communication server 20. When the predetermined time period has not elapsed (step S1504; NO), the message accepting unit 404 accepts an input of message data (step S1505).

The message sending unit 405 sends the communication server 20 the message data accepted by the message accepting unit 404 (step S1506).

The message data receiving unit 406 receives message data from the communication apparatus 10 (step S1507) and stores the same in the storage unit 203 (step S1508). The message receiving unit 406 stores the received message data, the received time and date, and information on the sender of the message data so that they are in association with each other. When the destination of the message data is specified, information thereon is stored as well.

In this way, message data sent from each of the communication apparatuses 10 is stored in the storage unit 203 of the communication server 20. When message data transmission from all the communication apparatuses 10 is allowed, message data from an arbitrary communication apparatus 10 are sequentially stored in the storage unit 203. When the current time and date is in the allowed time period specified by the allowance notice or the allowed time period is not extended for at least one of the communication apparatuses 10, only message data from the allowed communication apparatus 10 is stored in the storage unit 203.

The process to distribute message data is the same as that of embodiment 1, so an explanation thereon is omitted.

As above, the method of using an allowance notice or a disallowance notice can be adopted. To manage whether to always allow or disallow all the communication apparatuses 10 to send message data, the method of using an allowance notice is more desirable. To restrict (disallow) simultaneous message data transmission at a certain timing, the method of using a disallowance notice is more desirable. In either way, by restricting message data transmission at an important timing, in an important situation, or upon appearance of an important scene or occurrence of an important even of the game, game information can be readily made known to each player. Such game information includes game results and messages from key players.

The present invention is not limited to the aforesaid embodiments, and various modifications and applications can be made. Constituent elements of the aforesaid embodiments can be freely combined.

According to the foregoing embodiments, the communication server 20 is provided in addition to the communication apparatuses 10. At least one of a plurality of the communication apparatuses 10 may be configured to act as the aforesaid communication server 20. In such a case, the communication server 20 does not need to be additionally provided. The configuration of the communication system 1 can be thereby simplified.

A program that causes the communication apparatuses 10 and the communication server 20 to act as part or all of an apparatus and server may be stored in a computer-readable storage medium, such as a memory card, CD-ROM, DVD, or MO (Magneto Optical disk), for distribution. By doing so, the program can be installed in a computer so that it acts as the aforesaid means or performs the aforesaid processes.

Also, the program may be stored in a disk comprised in a server on the Internet or the like, so that the program can be superimposed on, e.g., transmission waves and downloaded to the computer.

A priority right is claimed for the present application based on Japanese Patent Application No. 2007-223938. The contents of this base application are herein incorporated in their entirety.

INDUSTRIAL APPLICABILITY

As explained above, the present invention enables provision of a communication system, a communication apparatus, a communication server, a communication method, an information storage medium, and a program that are suitable for readily informing each player of game information during the progress of the game.

The invention claimed is:

1. A communication system comprising a server and a plurality of communication apparatuses connected with each other via a network, the server and communication apparatuses configured to control messages between the communication apparatuses during a network game, each message including message data;
   wherein the server comprises:
   a determining unit that monitors play of the network game, detects an occurrence of a predetermined network game event during play of a session of the network game and determines whether to allow or disallow each of the plurality of communication apparatuses to send message data as a function of the occurrence of the predetermined network game event; and
   a notice sending unit that sends a disallowance notice including a predetermined period of time, the notice indicating that transmission of message data is temporarily disallowed during the play of the session of the network game for the predetermined period of time, to communication apparatuses that have been determined to be disallowed by the determining unit, of all the plurality of communication apparatuses;
   each of the communication apparatuses comprises:
   a notice receiving unit that receives the disallowance notice from the server;
   a message accepting unit that accepts an input of the message data from a user when the notice receiving unit is not in receipt of the disallowance notice; and
   a message sending unit that sends the server the message data accepted by the message accepting unit;
   the server further comprises:
   a message receiving unit that receives the message data from the communication apparatuses; and
   a distributing unit that distributes the message data received by the message receiving unit to each of the communication apparatuses; and
   each of the communication apparatuses further comprises:
   an output unit that outputs message data distributed by the server.

2. The communication system according to claim 1, wherein the message accepting unit also accepts an input of the message data from the user upon lapse of a predetermined time period since last receipt of the disallowance notice.

3. The communication system according to claim 1,
wherein each of the communication apparatuses further comprises an ID information storage unit that stores in advance ID information for identifying the communication apparatuses;
the notice sending unit sends the disallowance notice, which contains the ID information corresponding to the communication apparatuses that have been determined to be disallowed by the determining unit, to all the communication apparatuses comprised in the communication system, including the communication apparatuses that have been determined to be disallowed by the determining unit; and
the message accepting unit accepts an input of the message data from a user when the ID information indicated in the disallowance notice received by the notice receiving unit does not agree with the ID information stored in the ID information storage unit.

4. The communication system according to claim 1,
wherein each of the communication apparatuses further comprises:
an operation input accepting unit that accepts an operation input by the user; and
an operation input sending unit that sends the server information indicating the operation input accepted by the operation input accepting unit;
the server further comprises:
an operation input receiving unit that receives, from the communication apparatuses, the information indicating the operation input; and
the determining unit that determines, based on the information indicating the operation input received by the operation input receiving unit as well as on a predetermined condition set in advance for the communication apparatuses, whether each of the plurality of communication apparatuses satisfies the predetermined condition and disallows communication apparatuses that satisfy the predetermined condition to send message data.

5. The communication system according to claim 1,
wherein the message accepting unit accepts, from the user, an input of the message data by sound; and
the output unit replays and outputs sound of message data distributed from the server.

6. The communication system according to claim 1,
wherein ID information for identifying a communication apparatus that is allowed to send the message data is contained in the disallowance notice;
each of the communication apparatuses further comprises:
an image storage unit that stores ID information of the communication apparatuses and image data of a predetermined character object in association with each other; and
the output unit displays each of the image data of the predetermined character object stored in the image storage unit in a predetermined display format when the notice receiving unit is not in receipt of the disallowance notice and highlights and displays image data corresponding to the ID information not contained in the disallowance notice when the notice receiving unit is in receipt thereof.

7. The communication system according to claim 1,
wherein each of the communication apparatuses executes a network game via the network;
the server manages progress of the network game;
the server further comprises:
a parameter storage unit that in advance stores at least one of a predetermined timing, a predetermined situation, a predetermined scene, and a predetermined event of the network game as well as a numerical parameter for calculating the predetermined time period in association with each other; and
a game determining unit that determines, in the network game, whether any one of the predetermined timing, the predetermined situation, and the predetermined scene has occurred or whether the predetermined event has occurred;
the notice sending unit acquires from the parameter storage unit, upon determination by the game determining unit that one of the predetermined timing, the predetermined situation, and the predetermined scene has occurred or that the predetermined event has occurred, the numerical parameter associated with at least one of the predetermined timing, the predetermined situation, the predetermined scene, and the predetermined event; calculates the predetermined time period based on the acquired numerical parameter; and sends the disallowance notice containing the calculated predetermined time period to the communication apparatuses that have been determined to be disallowed by the determining unit; and
the message accepting unit accepts an input of the message data from a user upon lapse of the predetermined time period indicated in the disallowance notice received by the notice receiving unit since last receipt of the disallowance notice.

8. A communication system, comprising a server and a plurality of communication apparatuses connected with each other via a network,
wherein the server comprises:
a determining unit that determines whether to allow or disallow each of the plurality of communication apparatuses to send message data; and
a notice sending unit that sends a disallowance notice, the notice indicating that transmission of the message data is disallowed, to communication apparatuses that have been determined to be disallowed by the determining unit, of all the plurality of communication apparatuses;
each of the communication apparatuses comprises:
a notice receiving unit that receives the disallowance notice from the server;
a message accepting unit that accepts an input of the message data from a user when the notice receiving unit is not in receipt of the disallowance notice; and
a message sending unit that sends the server the message data accepted by the message accepting unit;
the server further comprises:
a message receiving unit that receives the message data from the communication apparatuses; and
a distributing unit that distributes the message data received by the message receiving unit to each of the communication apparatuses; and
each of the communication apparatuses further comprises:
an output unit that outputs message data distributed by the server,
wherein each of the communication apparatuses executes a network game via the network;
the server manages progress of the network game;
the server further comprises:
a parameter storage unit that in advance stores at least one of a predetermined timing, a predetermined situation, a predetermined scene, and a predetermined event of the network game as well as a numerical parameter for calculating the predetermined time period in association with each other; and a game determining unit that determines, in the network game, whether any one of the predetermined timing, the predetermined situation, and the predetermined scene has occurred or whether the predetermined event has occurred;

the notice sending unit acquires from the parameter storage unit, upon determination by the game determining unit that one of the predetermined timing, the predetermined situation, and the predetermined scene has occurred or that the predetermined event has occurred, the numerical parameter associated with at least one of the predetermined timing, the predetermined situation, the predetermined scene, and the predetermined event; calculates the predetermined time period based on the acquired numerical parameter; and sends the disallowance notice containing the calculated predetermined time period to the communication apparatuses that have been determined to be disallowed by the determining unit; and the message accepting unit accepts an input of the message data from a user upon lapse of the predetermined time period indicated in the disallowance notice received by the notice receiving unit since last receipt of the disallowance notice wherein the notice sending unit calculates the predetermined time period so that the predetermined time period monotonously increases along with a time elapsed from start of the network game to occurrence of at least one of the predetermined timing, the predetermined situation, and the predetermined scene or with a time elapsed from the start of the network game to occurrence of the predetermined event.

9. The communication system according to claim 1,
wherein each of the communication apparatuses further comprises:
a request accepting unit that accepts a request by the user for extension of the predetermined time period; and
a request sending unit that sends the server information indicating the request accepted by the request accepting unit;
the server further comprises a request receiving unit that receives the information indicating the request from the communication apparatuses;
the determining unit further determines, based on a total number of the requests received by the request receiving unit as well as on a total number of the communication apparatuses connected to the network, whether or not to extend the predetermined time period; and
the notice sending unit resends, upon determination to extend by the determining unit, a disallowance notice, the notice indicating that transmission of the message data is disallowed, to communication apparatuses to which the disallowance notice was last sent.

10. The communication system according to claim 1,
wherein the distributing unit distributes the message data to, of all the communication apparatuses, communication apparatuses other than the communication apparatus that has sent the message data received by the message receiving unit.

11. A communication system comprising a server and a plurality of communication apparatuses connected with each other via a network, the server and communication apparatuses configured to control messages between the communication apparatuses during a network game, each message including message data;
wherein the server comprises:
a determining unit that monitors play of the network game, detects an occurrence of a predetermined network game event during play of a session of the network game, and determines whether to allow or disallow each of the plurality of communication apparatuses to send message data as a function of the occurrence of the predetermined network game event; and
a notice sending unit that sends an allowance notice, the notice indicating that transmission of the message data is temporarily allowed during play of the session of the network game for a predetermined time period, to a communication apparatus that has been determined to be allowed by the determining unit, of all the plurality of communication apparatuses;
each of the communication apparatuses comprises:
a notice receiving unit that receives the disallowance notice from the server;
a message accepting unit that accepts an input of the message data from a user when the notice receiving unit is in receipt of the allowance notice; and
a message sending unit that sends the server the message data accepted by the message accepting unit;
the server further comprises:
a message receiving unit that receives the message data from the communication apparatuses; and
a distributing unit that distributes the message data received by the message receiving unit to each of the communication apparatuses; and
each of the communication apparatuses further comprises:
an output unit that outputs message data distributed by the server.

12. The communication system according to claim 11,
wherein the message accepting unit accepts an input of the message data from the user when the notice receiving unit is in receipt of the allowance notice and a current time and date is in the predetermined time period indicated in the allowance notice.

13. A communication apparatus configured, along with a server, to control messages during play of a session of a network game, each message including message data, comprising:
an image storage unit that stores image data of a predetermined character object in association with each ID information of a plurality of communication apparatuses;
a notice receiving unit that receives, from the server, a disallowance notice containing a predetermined period of time and ID information of communication apparatuses that are temporarily disallowed to send message data during play of the session of the network game for the predetermined period of time;
a message accepting unit that accepts an input of the message data from a user when the notice receiving unit is not in receipt of the disallowance notice;
a message sending unit that sends the server the message data accepted by the message accepting unit;
an output unit that outputs message data distributed by the server; and
a display unit that displays each of the image data of the predetermined character object stored in the image storage unit in a predetermined display format when the notice receiving unit is not in receipt of the disallowance notice and highlights and displays image data corresponding to the ID information contained in the disallowance notice when the notice receiving unit is in receipt thereof.

14. A communication server configured, along with a plurality of communication apparatuses, to control messages between the communication apparatuses during play of a session of a network game, each message including message data, comprising:
- a determining unit that monitors play of the network game and detects an occurrence of a predetermined network game event during play of the session of the network game and determines whether to allow or disallow each of the plurality of communication apparatuses connected to the server via a network to send message data;
- a notice sending unit that sends a disallowance notice, the notice indicating that transmission of message data is temporarily disallowed during play of the network game for a predetermined time period, to communication apparatuses that have been determined to be disallowed by the determining unit;
- a message receiving unit that receives the message data from a communication apparatus that has been determined to be allowed by the determining unit; and
- a distributing unit that distributes the message data received by the message receiving unit to each of the communication apparatuses.

15. A communication method to control messages during play of a session of a network game, each message including message data, the communication method being performed by a communication apparatus comprising an image storage unit in which image data of a predetermined character object is stored in association with each ID information of a plurality of the communication apparatuses, the method comprising:
- a notice receiving step of receiving, from a server, a disallowance notice containing a predetermined period of time and ID information of communication apparatuses that are temporarily disallowed to send message data during play of the session of the network game for the predetermined period of time;
- a message accepting step of accepting an input of the message data from a user when the disallowance notice is not received in the notice receiving step;
- a message sending step of sending the server the message data accepted in the message accepting step;
- an output step of outputting message data distributed from the server; and
- a display step of displaying each of the image data of the predetermined character object stored in the image storage unit in a predetermined display format when the disallowance notice is not received in the notice receiving step and highlighting and displaying image data corresponding to the ID information contained in the disallowance notice when the disallowance notice is received therein.

16. A communication method to control messages communicated between a plurality of communication apparatuses during a network game, each message including message data, comprising:
- a determining step of monitoring play of the network game, detecting an occurrence of a predetermined network game event during play of a session of the network game and determining whether to allow or disallow each of the plurality of communication apparatuses connected via a network to send message data;
- a notice sending step of sending a disallowance notice, the notice indicating that transmission of the message data is temporarily disallowed during play of the session of the network game for a predetermined time period, to communication apparatuses that have been determined to be disallowed in the determining step;
- a message receiving step of receiving the message data from a communication apparatus that has been determined to be allowed in the determining step; and
- a distributing step of distributing the message data received in the message receiving step to each of the communication apparatuses.

17. A non-transitory computer-readable information storage medium storing a program to control messages during a session of a network game, each message including message data, the program causing a computer to act as:
- an image storage unit that stores image data of a predetermined character object in association with each ID information of a plurality of communication apparatuses;
- a notice receiving unit that receives, from a server, a disallowance notice containing a predetermined period of time and ID information of communication apparatuses that are temporarily disallowed to send message data during play of the session of the network game for the predetermined period of time;
- a message accepting unit that accepts an input of the message data from a user when the notice receiving unit is not in receipt of the disallowance notice;
- a message sending unit that sends the server the message data accepted by the message accepting unit;
- an output unit that outputs message data distributed by the server; and
- a display unit that displays each of the image data of the predetermined character object stored in the image storage unit in a predetermined display format when the notice receiving unit is not in receipt of the disallowance notice and highlights and displays image data corresponding to the ID information contained in the disallowance notice when the notice receiving unit is in receipt thereof.

18. A non-transitory computer-readable information storage medium storing a program to control messages communicated between a plurality of communication apparatuses during a network game, each message including message data, the program causing a computer to act as:
- a determining unit that monitors play of the network game, detects an occurrence of a predetermined network game event during play of a session of the network game, and determines whether to allow or disallow each of the plurality of communication apparatuses connected via a network to send message data;
- a notice sending unit that sends a disallowance notice, the notice indicating that transmission of the message data is temporarily disallowed during play of the session of the network game for a predetermined time period, to communication apparatuses that have been determined to be disallowed by the determining unit;
- a message receiving unit that receives the message data from a communication apparatus that has been determined to be allowed by the determining unit; and
- a distributing unit that distributes the message data received by the message receiving unit to each of the communication apparatuses.

19. A program to control messages during a session of a network game, each message containing message data, the program being stored on a non-transitory computer readable medium and causing a computer to act as:
- an image storage unit that stores image data of a predetermined character object in association with each ID information of a plurality of communication apparatuses;
- a notice receiving unit that receives, from a server, a disallowance notice containing a predetermined period of time and ID information of communication apparatuses that are allowed to temporarily send message data for the predetermined period of time during play of the session of the network game;

a message accepting unit that accepts an input of the message data from a user when the notice receiving unit is not in receipt of the disallowance notice;

a message sending unit that sends the server the message data accepted by the message accepting unit;

an output unit that outputs message data distributed by the server; and a display unit that displays each of the image data of the predetermined character object stored in the image storage unit in a predetermined display format when the notice receiving unit is not in receipt of the disallowance notice and highlights and displays image data corresponding to the ID information contained in the disallowance notice when the notice receiving unit is in receipt thereof.

20. A program to control messages between a plurality of communication apparatuses, the program being stored on a non-transitory computer readable medium and causing causes a computer to act as:

a determining unit that monitors play of the network game, detecting the occurrence of a predetermined network game event during play of a session of the network game and determines whether to allow or disallow each of the communication apparatuses connected via a network to send message data;

a notice sending unit that sends a disallowance notice, the notice indicating that transmission of message data is temporarily disallowed during play of the session of the network game for a predetermined time period, to communication apparatuses that have been determined to be disallowed by the determining unit;

a message receiving unit that receives the message data from a communication apparatus that has been determined to be allowed by the determining unit; and a distributing unit that distributes the message data received by the message receiving unit to each of the communication apparatuses.

\* \* \* \* \*